US012657644B2

(12) United States Patent
Powers et al.

(10) Patent No.: US 12,657,644 B2
(45) Date of Patent: Jun. 16, 2026

(54) METHOD AND APPARATUS FOR PROTECTING DIGITAL PHOTOS FROM ALTERATION

(71) Applicant: SIGNS & WONDERS UNLIMITED, LLC, Libertyville, IL (US)

(72) Inventors: Nancy Powers, Libertyville, IL (US); Terrence M. Fortuna, Clarkston, MI (US); Paul Kocsis, Omaha, NE (US)

(73) Assignee: SIGNS & WONDERS UNLIMITED LLC, Libertyville, IL (US)

( * ) Notice: Subject to any disclaimer, the term of this patent is extended or adjusted under 35 U.S.C. 154(b) by 266 days.

(21) Appl. No.: 18/352,135

(22) Filed: Jul. 13, 2023

(65) Prior Publication Data

US 2023/0360165 A1 Nov. 9, 2023

Related U.S. Application Data

(63) Continuation of application No. 15/260,074, filed on Sep. 8, 2016, now abandoned, which is a continuation-in-part of application No. 15/170,830, filed on Jun. 1, 2016, now Pat. No. 10,546,360, which is a continuation of application No. 14/310,941, filed on Jun. 20, 2014, now Pat. No. 9,384,520.

(60) Provisional application No. 61/837,828, filed on Jun. 21, 2013.

(51) Int. Cl.
    *G06T 1/00*      (2006.01)
    *G06F 21/00*     (2013.01)
    *G06F 21/64*     (2013.01)
(52) U.S. Cl.
    CPC ............ *G06T 1/0021* (2013.01); *G06F 21/00* (2013.01); *G06F 21/64* (2013.01); *G06T 1/0028* (2013.01); *G06T 1/0042* (2013.01); *G06T 2201/005* (2013.01); *G06T 2201/0051* (2013.01)

(58) Field of Classification Search
    None
    See application file for complete search history.

(56) References Cited

U.S. PATENT DOCUMENTS

| | | | |
|---|---|---|---|
| 5,136,646 | A | 8/1992 | Haber et al. |
| 5,875,249 | A | 2/1999 | Mintzer et al. |
| 5,875,264 | A | 2/1999 | Carlstrom |
| (Continued) | | | |

FOREIGN PATENT DOCUMENTS

| | | |
|---|---|---|
| WO | 9626494 | 8/1996 |
| WO | 0049797 A2 | 8/2000 |

OTHER PUBLICATIONS

Raj, Voruganti Arun Kumar, Master Thesis: Digital Image Tamper Detection Tools, Hochschule Karisruhe Technik und Wirtschaft University of Applied Sciences, Germany, Sep. 2005, pp. ivi & 1-48.

(Continued)

*Primary Examiner* — Jiangeng Sun
(74) *Attorney, Agent, or Firm* — Pillsbury Winthrop Shaw Pittman LLP

(57) ABSTRACT

An encoding apparatus partitions a digital image into multiple regions for subsequent encoding. A first encryption code is associated with a first region, a second encryption code is associated with a second region and the first code, and a third code is associated with the first code, the second code and a third region. An authentication apparatus authenticates the digital image in an inverse process.

5 Claims, 22 Drawing Sheets

(56) References Cited

U.S. PATENT DOCUMENTS

| | | | |
|---|---|---|---|
| 5,898,779 A | 4/1999 | Squilla et al. | |
| 6,005,936 A | 12/1999 | Shimizu et al. | |
| 6,434,701 B1 | 8/2002 | Kwan | |
| 7,031,491 B1 | 4/2006 | Donescu et al. | |
| 7,047,222 B1 | 5/2006 | Bush | |
| 7,206,432 B2 * | 4/2007 | Iwamura | H04N 1/32352 |
| | | | 713/176 |
| 7,308,577 B2 | 12/2007 | Wakao | |
| 7,313,696 B2 | 12/2007 | de Queiroz | |
| 8,155,457 B2 | 4/2012 | Cohen | |
| 8,160,293 B1 | 4/2012 | Fridrich et al. | |
| 8,175,322 B2 * | 5/2012 | Tian | G06T 1/0042 |
| | | | 380/54 |
| 8,515,062 B2 | 8/2013 | Nakagata et al. | |
| 8,588,414 B2 * | 11/2013 | Ishii | H04N 1/32272 |
| | | | 380/54 |
| 8,595,503 B2 | 11/2013 | Ming | |
| 8,670,560 B2 | 3/2014 | Cheddad et al. | |
| 2001/0007131 A1 * | 7/2001 | Galasso | G06F 21/575 |
| | | | 713/189 |
| 2002/0002675 A1 | 1/2002 | Bush | |
| 2002/0053021 A1 * | 5/2002 | Rice | G06Q 10/10 |
| | | | 713/176 |
| 2002/0090107 A1 | 7/2002 | Acharya et al. | |
| 2002/0095388 A1 * | 7/2002 | Yu | G06Q 20/04 |
| | | | 705/67 |
| 2003/0126432 A1 * | 7/2003 | Tonisson | G11B 20/0021 |
| 2004/0017926 A1 | 1/2004 | Tonnisson | |
| 2005/0169498 A1 * | 8/2005 | Choi | G06T 1/0071 |
| | | | 382/100 |
| 2005/0190948 A1 | 9/2005 | Isogai | |
| 2005/0259844 A1 | 11/2005 | Kot et al. | |
| 2006/0041762 A1 | 2/2006 | Ma | |
| 2006/0157574 A1 | 7/2006 | Farrar et al. | |
| 2007/0253592 A1 | 11/2007 | Sun et al. | |
| 2010/0008538 A1 | 1/2010 | Rodriguez et al. | |
| 2012/0275641 A1 | 11/2012 | Al-Omari et al. | |
| 2012/0280029 A1 | 11/2012 | Simske et al. | |
| 2013/0039588 A1 | 2/2013 | Li et al. | |
| 2015/0039902 A1 | 2/2015 | Arya et al. | |
| 2015/0139295 A1 | 5/2015 | Yaroshenko | |
| 2016/0035059 A1 | 2/2016 | Rodriguez et al. | |

OTHER PUBLICATIONS

Krawetz, A Picture's Worth . . . Digital Image Analysis and Forensics Version 2, 2008, Hacker Factor Solutions, presented at Black Hat Briefings, DC 2008, pp. 1-43.

Hany Farid, Image Forgery Detection A Survey, IEEE Signal Processing Magazine, 2009, pp. 16-25, downloaded Apr. 1, 2009 at 18:20 from IEEE Xplore.

Affine Ciopher, Jame Lyons, Sep. 12, 2009.

Lyons, James, Affine Ciopher, Sep. 12, 2009.

Thomas Gloe, "Forensic Analysis of Ordered Data Structures on the Example of JPEG Files", WIFS'2012, Dec. 2-5, 2012.

"Kuznetsov, et al., Detecting Forged (Altered) Images,htto://articles. forensicfocus.com 2013/08/22/detectina-foraed-altered-imaaes/, pp. 1-9".

"ExifCleaner—an Ultimate Exit Tag Remover, Nov. 2009, pp. 1-2, accessed from https://web.archive.org/Web/20091129104618/http:// www.superutils.com/products/exifcleaner/ on Jun. 20, 2018."

"META 101, photometadata.org, 2010, pp. 1-3, accessed from https://web.archive.org/web/20100528115010/http:l/2www. photometadata.org/MET A-101, and https://web.archive.org/web/ 20100528105709/http://www.photometadata.t>rg :80/META-101-metadata-types on Jun. 20, 2018."

"PCT International Application No. PCT/US2014/043451, International Search Report and Written Opinion, mailed Oct. 15, 2014."

European Patent Office, Supplementary European Search Report for EP 14895448, Dec. 18, 2017, p. 1.

* cited by examiner

100

200

300

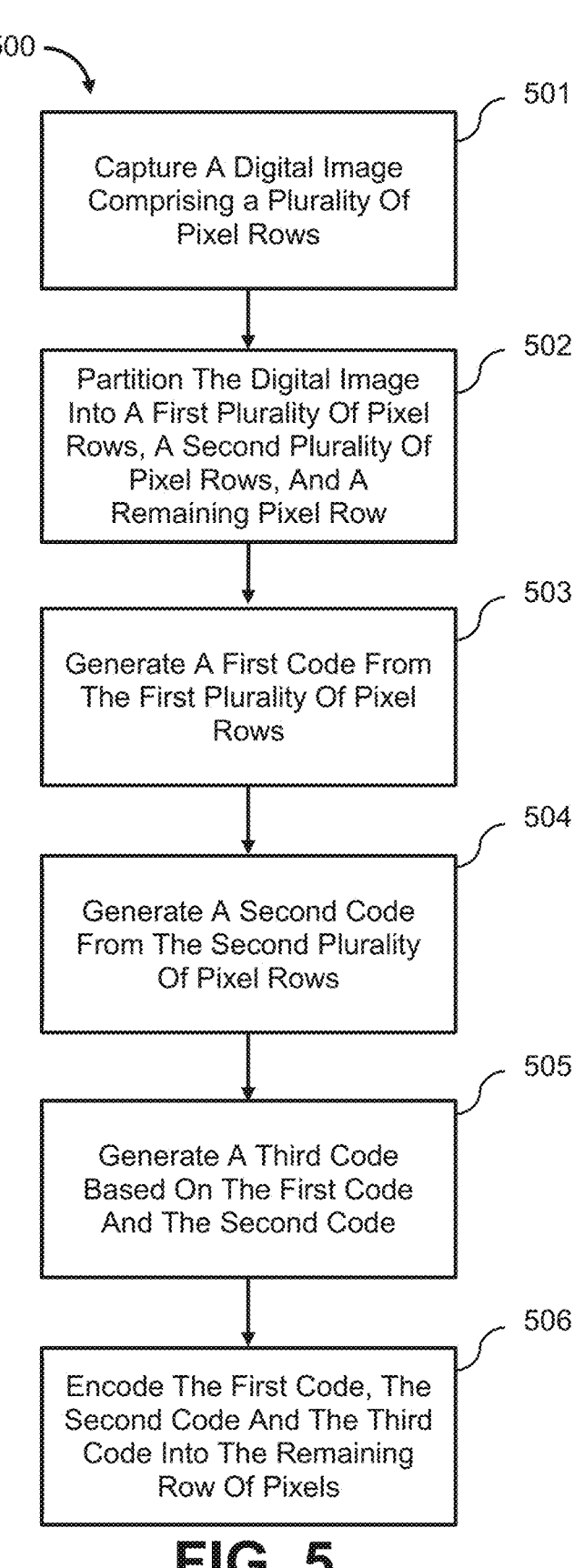

500

501
Capture A Digital Image Comprising a Plurality Of Pixel Rows

502
Partition The Digital Image Into A First Plurality Of Pixel Rows, A Second Plurality Of Pixel Rows, And A Remaining Pixel Row 503
Generate A First Code From The First Plurality Of Pixel Rows 504
Generate A Second Code From The Second Plurality Of Pixel Rows 505
Generate A Third Code Based On The First Code And The Second Code 506
Encode The First Code, The Second Code And The Third Code Into The Remaining Row Of Pixels

Ref. Character Set:

0123456789ABCDEFGHIJKLMNOPQRSTUVWXYZabcdefghijklmnopqrstuvwxyz{}~:;<=>?@^_!#$%&'()*+,/

703

Random Position Codes:  32, 50, 59, 22, 42, 80, 71, 67, 48, 88

704

Starting Index:  r=(32+50+59+22+42+80+71+557+48+88)mod(256) = (559)mod(256)=47

701

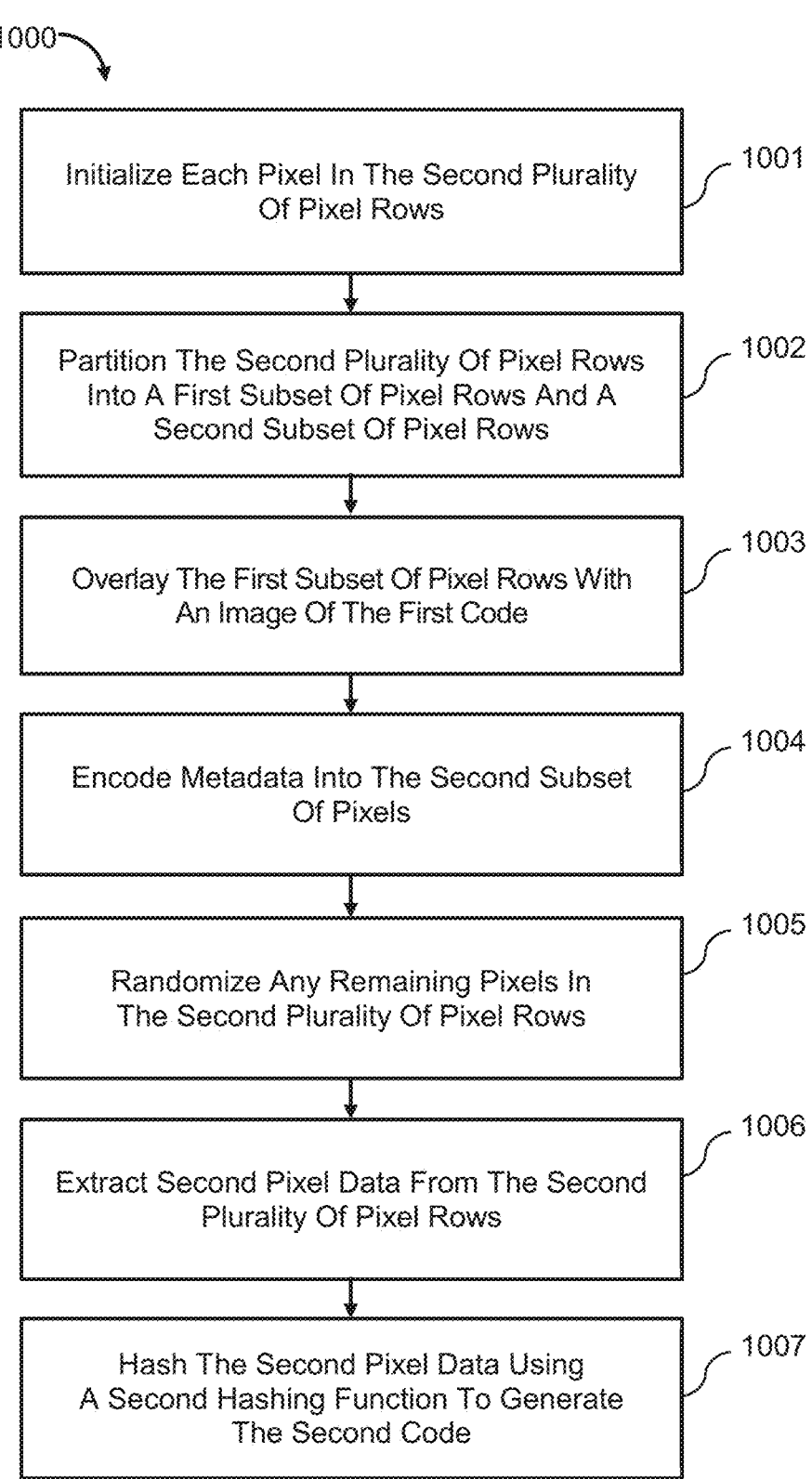

1000

Initialize Each Pixel In The Second Plurality Of Pixel Rows — 1001

Partition The Second Plurality Of Pixel Rows Into A First Subset Of Pixel Rows And A Second Subset Of Pixel Rows — 1002

Overlay The First Subset Of Pixel Rows With An Image Of The First Code — 1003

Encode Metadata Into The Second Subset Of Pixels — 1004

Randomize Any Remaining Pixels In The Second Plurality Of Pixel Rows — 1005

Extract Second Pixel Data From The Second Plurality Of Pixel Rows — 1006

Hash The Second Pixel Data Using A Second Hashing Function To Generate The Second Code — 1007

FIG. 10

Second Plurality Of Pixels
(1101)

CA966180FBB7CODF5EAF

Second
Subset Of
Pixel Rows
(1103A)

First Subset
Of Pixel
Rows
(1102)

CA966180FBB7CODF5EAF

Second Subset Of
Pixel Rows
(1103B)

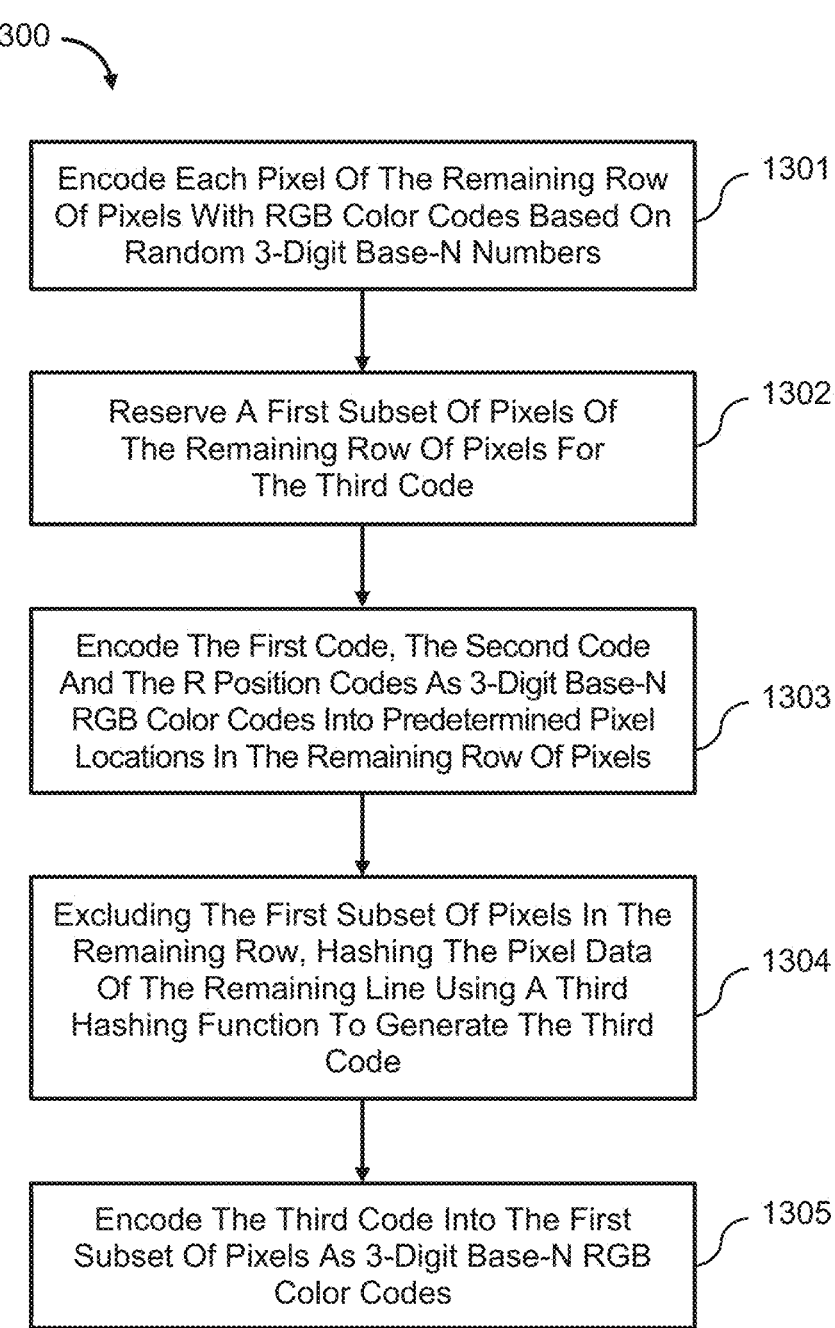

1300

1301
Encode Each Pixel Of The Remaining Row Of Pixels With RGB Color Codes Based On Random 3-Digit Base-N Numbers 1302
Reserve A First Subset Of Pixels Of The Remaining Row Of Pixels For The Third Code 1303
Encode The First Code, The Second Code And The R Position Codes As 3-Digit Base-N RGB Color Codes Into Predetermined Pixel Locations In The Remaining Row Of Pixels 1304
Excluding The First Subset Of Pixels In The Remaining Row, Hashing The Pixel Data Of The Remaining Line Using A Third Hashing Function To Generate The Third Code 1305
Encode The Third Code Into The First Subset Of Pixels As 3-Digit Base-N RGB Color Codes

1701 — Extract A Third Code From A Third Subset Of Pixels In The Remaining Row Of Pixels 1702 — Extract Third Pixel Data From The First Plurality Of Pixel Rows 1703 — Hash The Third Pixel Data Using A Third Hashing Function To Generate A Third Comparison Code 1704 — Compare The Third Code To The Third Comparison Code To Determine If The First Plurality Of Pixel Rows Has Been Altered

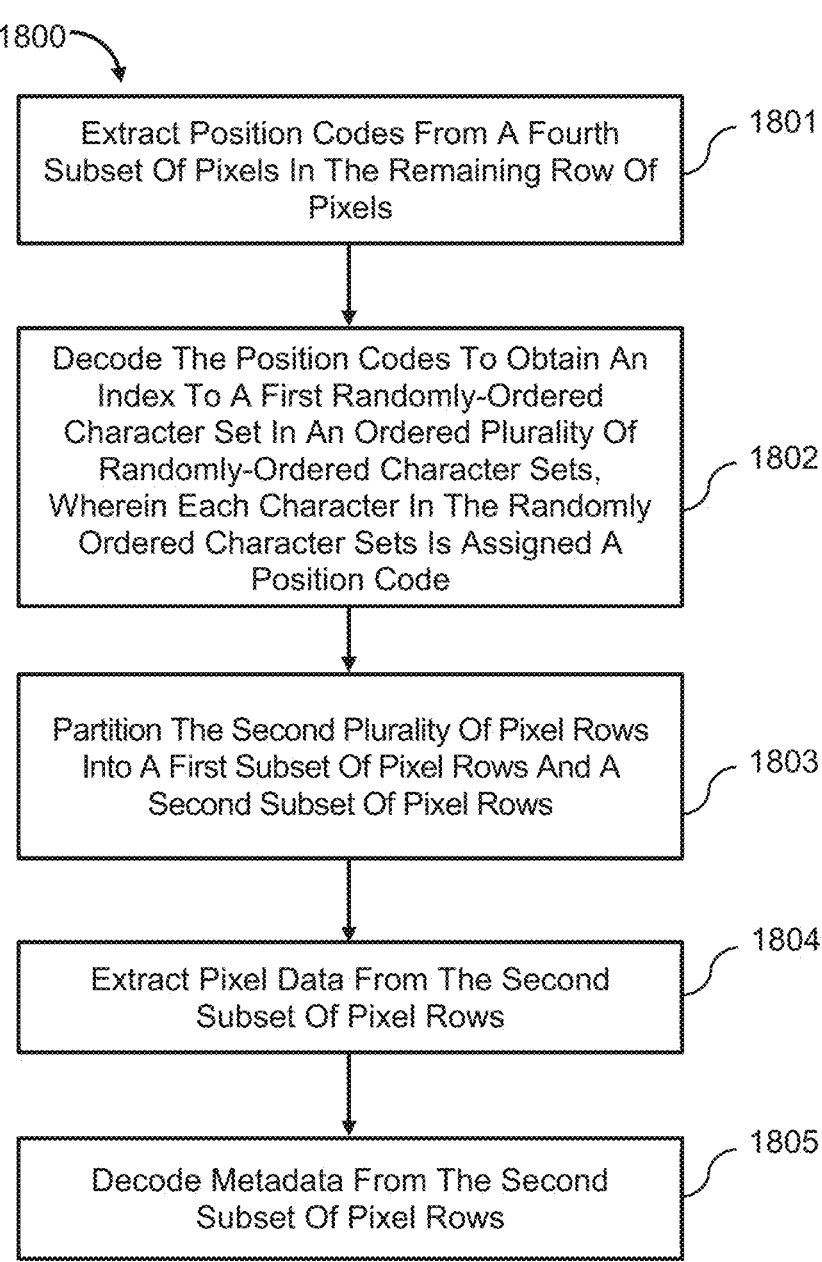

1800

Extract Position Codes From A Fourth Subset Of Pixels In The Remaining Row Of Pixels — 1801

Decode The Position Codes To Obtain An Index To A First Randomly-Ordered Character Set In An Ordered Plurality Of Randomly-Ordered Character Sets, Wherein Each Character In The Randomly Ordered Character Sets Is Assigned A Position Code — 1802

Partition The Second Plurality Of Pixel Rows Into A First Subset Of Pixel Rows And A Second Subset Of Pixel Rows — 1803

Extract Pixel Data From The Second Subset Of Pixel Rows — 1804

Decode Metadata From The Second Subset Of Pixel Rows — 1805

FIG. 18

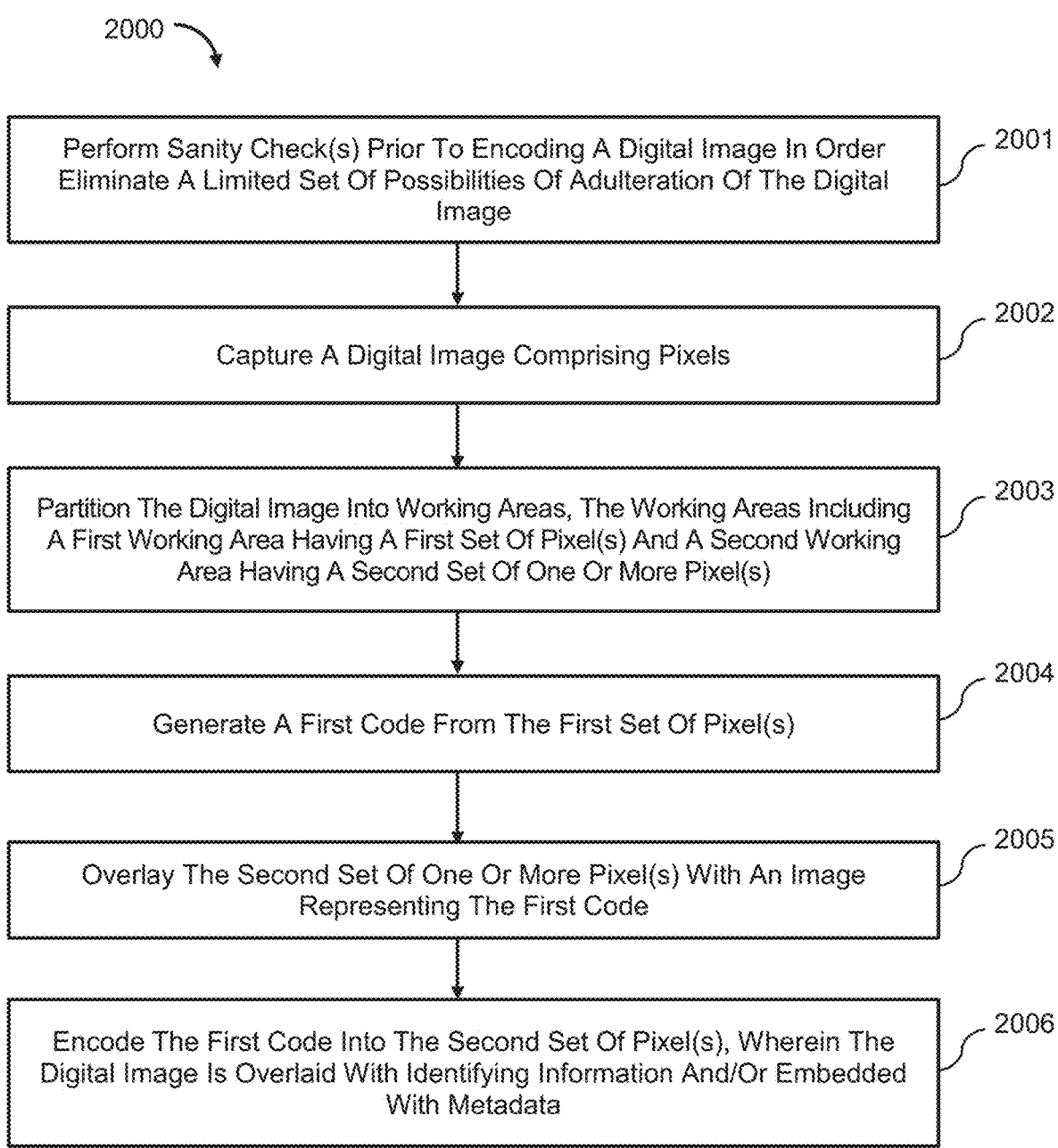

2000

| 2001 |
| Perform Sanity Check(s) Prior To Encoding A Digital Image In Order Eliminate A Limited Set Of Possibilities Of Adulteration Of The Digital Image |

| 2002 |
| Capture A Digital Image Comprising Pixels |

| 2003 |
| Partition The Digital Image Into Working Areas, The Working Areas Including A First Working Area Having A First Set Of Pixel(s) And A Second Working Area Having A Second Set Of One Or More Pixel(s) |

| 2004 |
| Generate A First Code From The First Set Of Pixel(s) |

| 2005 |
| Overlay The Second Set Of One Or More Pixel(s) With An Image Representing The First Code |

| 2006 |
| Encode The First Code Into The Second Set Of Pixel(s), Wherein The Digital Image Is Overlaid With Identifying Information And/Or Embedded With Metadata |

FIG. 20

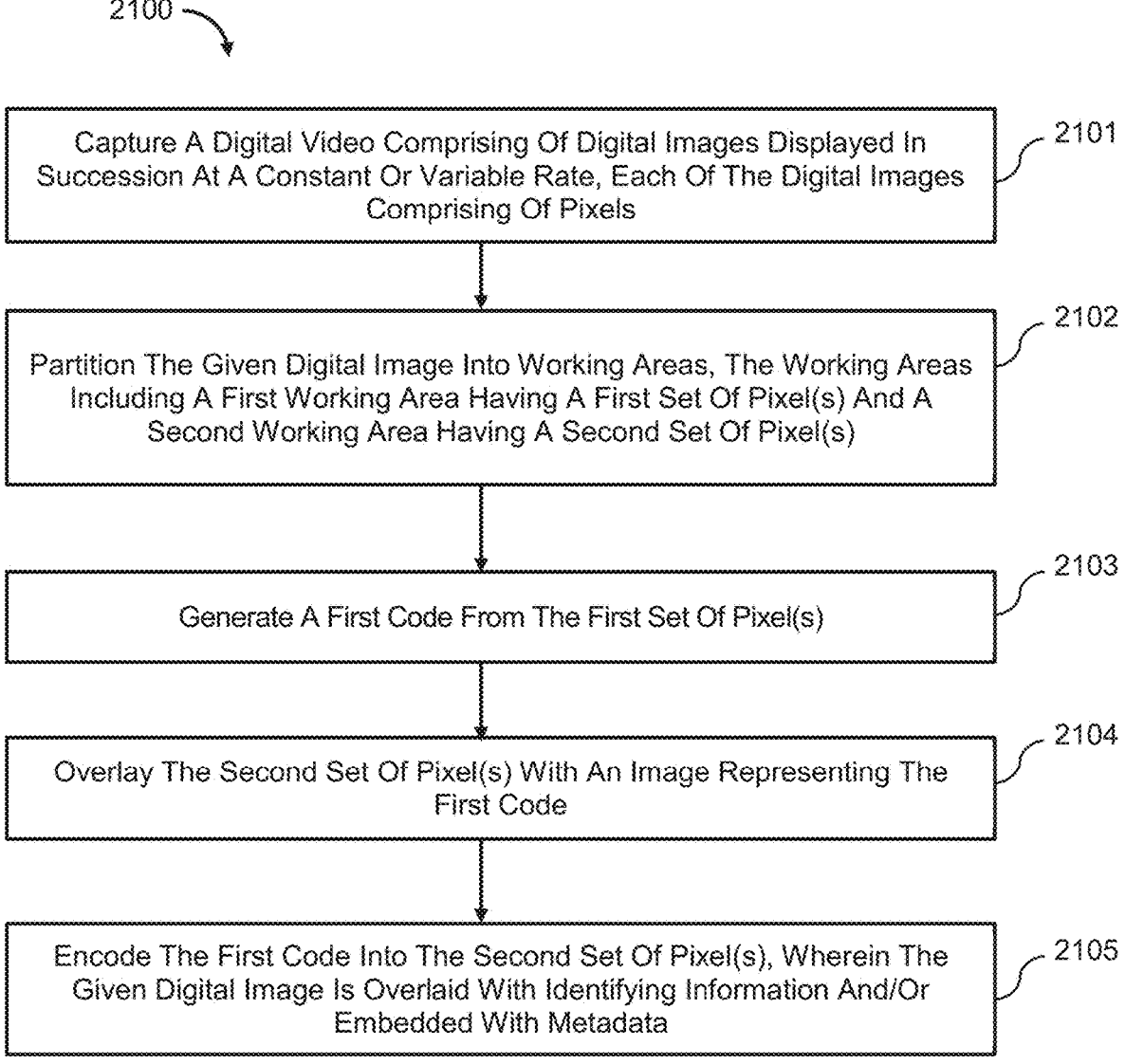

2100

Capture A Digital Video Comprising Of Digital Images Displayed In Succession At A Constant Or Variable Rate, Each Of The Digital Images Comprising Of Pixels — 2101

Partition The Given Digital Image Into Working Areas, The Working Areas Including A First Working Area Having A First Set Of Pixel(s) And A Second Working Area Having A Second Set Of Pixel(s) — 2102

Generate A First Code From The First Set Of Pixel(s) — 2103

Overlay The Second Set Of Pixel(s) With An Image Representing The First Code — 2104

Encode The First Code Into The Second Set Of Pixel(s), Wherein The Given Digital Image Is Overlaid With Identifying Information And/Or Embedded With Metadata — 2105

FIG. 21

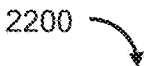

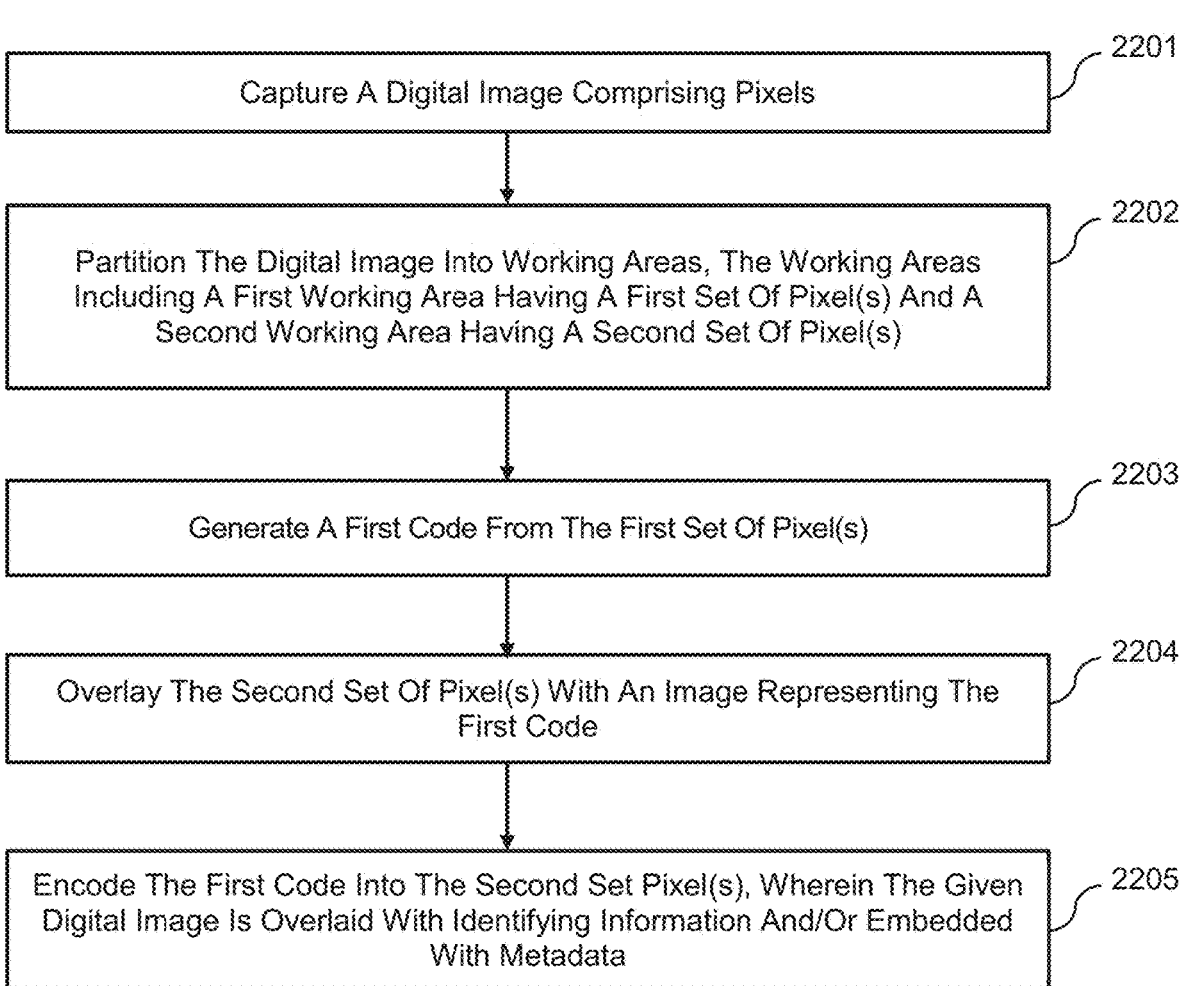

2201

Capture A Digital Image Comprising Pixels

2202

Partition The Digital Image Into Working Areas, The Working Areas Including A First Working Area Having A First Set Of Pixel(s) And A Second Working Area Having A Second Set Of Pixel(s)

2203

Generate A First Code From The First Set Of Pixel(s)

2204

Overlay The Second Set Of Pixel(s) With An Image Representing The First Code

2205

Encode The First Code Into The Second Set Pixel(s), Wherein The Given Digital Image Is Overlaid With Identifying Information And/Or Embedded With Metadata

FIG. 22

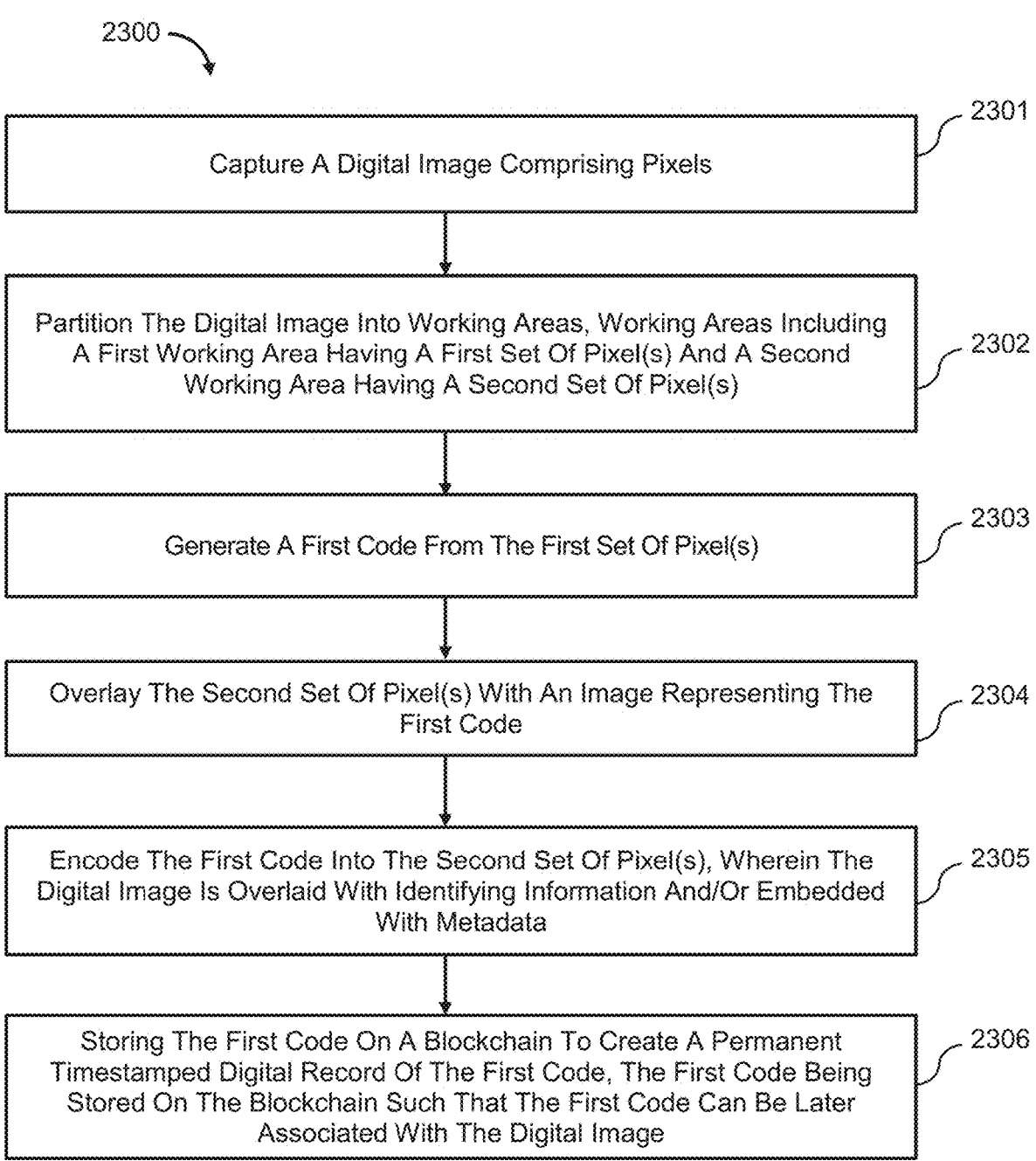

2300

2301
Capture A Digital Image Comprising Pixels

2302
Partition The Digital Image Into Working Areas, Working Areas Including A First Working Area Having A First Set Of Pixel(s) And A Second Working Area Having A Second Set Of Pixel(s)

2303
Generate A First Code From The First Set Of Pixel(s)

2304
Overlay The Second Set Of Pixel(s) With An Image Representing The First Code 2305
Encode The First Code Into The Second Set Of Pixel(s), Wherein The Digital Image Is Overlaid With Identifying Information And/Or Embedded With Metadata 2306
Storing The First Code On A Blockchain To Create A Permanent Timestamped Digital Record Of The First Code, The First Code Being Stored On The Blockchain Such That The First Code Can Be Later Associated With The Digital Image

FIG. 23

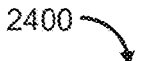
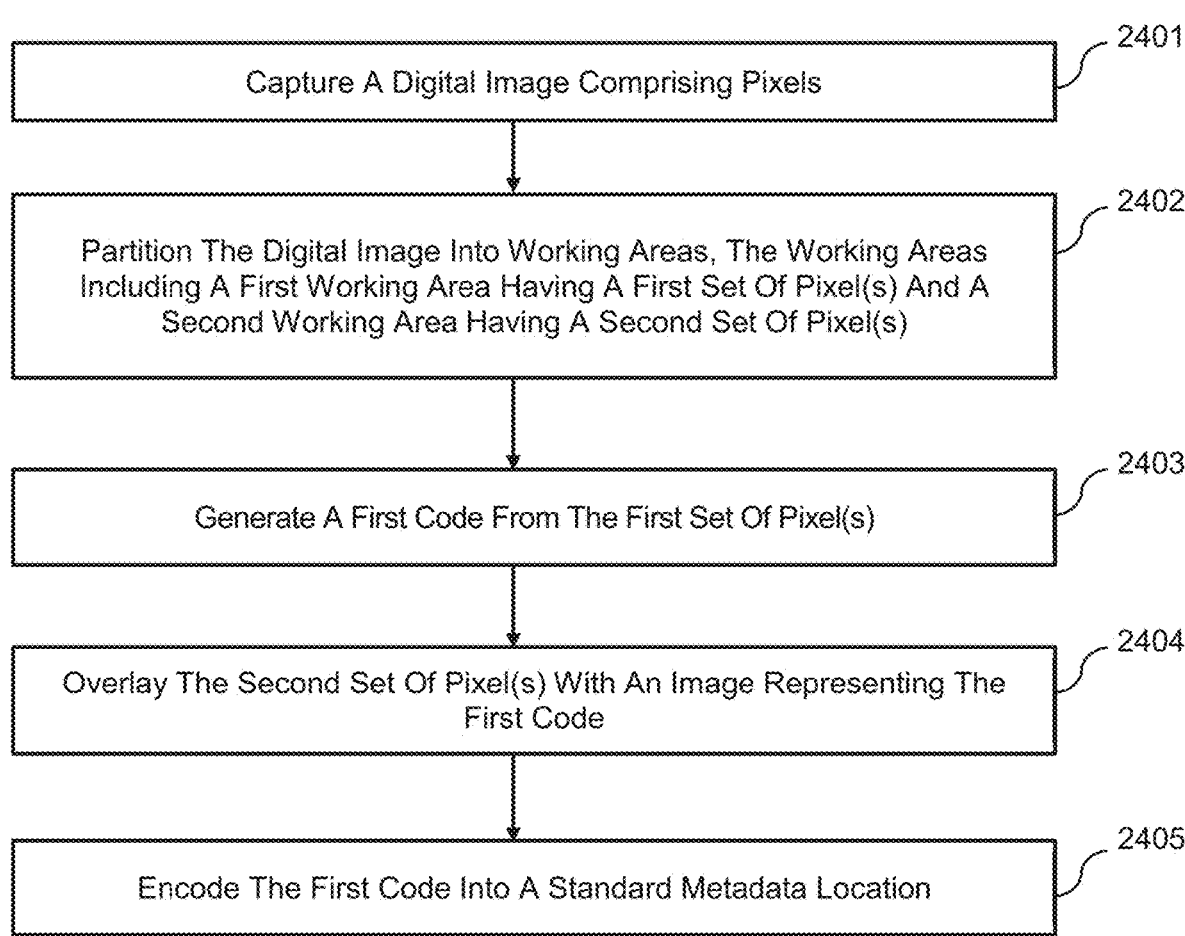
FIG. 24

METHOD AND APPARATUS FOR PROTECTING DIGITAL PHOTOS FROM ALTERATION

CROSS-REFERENCE TO RELATED APPLICATIONS

This present application is a continuation of U.S. patent application Ser. No. 15/260,074, filed Sep. 8, 2016, entitled "METHOD AND APPARATUS FOR PROTECTING DIGITAL PHOTOS FROM ALTERATION, which is a continuation-in-part of and claims priority to continuation application U.S. patent application Ser. No. 15/170,830, filed Jun. 1, 2016, entitled "SYSTEM AND METHOD FOR ENCODING AND AUTHENTICATING A DIGITAL IMAGE," which in turn is a continuation of and claims priority to U.S. patent application Ser. No. 14/310,941, filed Jun. 20, 2014, entitled "SYSTEM AND METHOD FOR ENCODING AND AUTHENTICATING A DIGITAL IMAGE," which was issued as U.S. Pat. No. 9,384,520, on Jul. 5, 2016, which in turn claims priority to U.S. Provisional Patent Application Ser. No. 61/837,828, filed Jun. 21, 2013, and entitled, "SYSTEM AND METHOD FOR ENCODING AND AUTHENTICATING A DIGITAL IMAGE," all of which incorporated herein by reference.

TECHNICAL FIELD

The present disclosure relates generally to the field of digital image processing and, more particularly, to protective encoding and authentication of digital images.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The proliferation of digital cameras and camera-equipped smartphones, along with sophisticated image processing software such as Adobe Photoshop® have made it extremely easy to alter digital photographs, and such doctored photographs are appearing with increasing frequency. Conventional digital forensic techniques use variations of statistical analysis to detect alterations due to cloning, resampling, splicing and the like. While useful in many different contexts, these techniques are not capable of authenticating every individual pixel in a digital image.

SUMMARY

One aspect of the disclosure relates to a system configured for encoding a digital image to facilitate subsequent authentication. The system may comprise one or more hardware processors configured by machine-readable instructions to perform one or more sanity checks are prior to encoding a digital image in order eliminate a limited set of possibilities of adulteration of the digital image. A digital image comprising a plurality of pixels may be captured. The digital image may be partitioned into two or more working areas. The two or more working areas may include a first working area having a first set of one or more pixels and a second working area having a second set of one or more pixels. A first code may be generated from the first set of one or more pixels. The second set of one or more pixels may be overlaid with an image representing the first code. The first code may be encoded into the second set of one or more pixels, wherein the digital image may be overlaid with identifying information and/or embedded with metadata.

Another aspect of the disclosure relates to a system configured for encoding a digital video to facilitate subsequent authentication. The system may comprise one or more hardware processors configured by machine-readable instructions to capture a digital video comprising a plurality of digital images displayed in succession at a constant or variable rate. Each of the plurality of digital images may comprise a plurality of pixels. For a given digital image of the plurality of digital images, several operations may be performed. The given digital image may be partitioned into two or more working areas. The two or more working areas may include a first working area having a first set of one or more pixels and a second working area have a second set of one or more pixels. A first code may be generated from the first set of one or more pixels. The second set of one or more pixels may be overlaid with an image representing the first code. The first code may be encoded into the second set of one or more pixels, wherein the given digital image may be overlaid with identifying information and/or embedded with metadata.

Yet another aspect of the disclosure relates to a system configured for encoding a digital image to facilitate subsequent authentication. The system may comprise one or more hardware processors configured by machine-readable instructions to capture digital image comprising a plurality of pixels. The digital image may be partitioned into two or more working areas. The two or more working areas may include a first working area having a first set of one or more pixels and a second working area having a second set of one or more pixels. A first code may be generated from the first set of one or more pixels. The second set of one or more pixels may be overlaid with an image representing the first code. The first code is encoded into the second set of one or more pixels. The digital image may be overlaid with identifying information and/or embedded with metadata. Encoding the first code may include utilizing asymmetric cryptographic keypairs having a public key and a private key.

Yet another aspect of the disclosure relates to a system configured for encoding a digital image to facilitate subsequent authentication. The system may comprise one or more hardware processors configured by machine-readable instructions to capture a digital image comprising a plurality of pixels. The digital image may be partitioned into two or more working areas. The two or more working areas may include a first working area having a first set of one or more pixels and a second working area having a second set of one or more pixels. A first code may be generated from the first set of one or more pixels. The second set of one or more pixels may be overlaid with an image representing the first code. The first code may be encoded into the second set of one or more pixels. The digital image may be overlaid with identifying information and/or embedded with metadata. The first code may be stored on a blockchain to create a permanent timestamped digital record of the first code. The first code may be stored on the blockchain such that the first code can be later associated with the digital image.

Yet another aspect of the disclosure relates to a system configured for encoding a digital image to facilitate subsequent authentication. The system may comprise one or more hardware processors configured by machine-readable instructions to capture a digital image comprising a plurality of pixels. A digital image comprising a plurality of pixels may be captured. The digital image may be partitioned into two or more working areas. The two or more working areas may include a first working area having a first set of one or more pixels and a second working area having a second set of one or more pixels. A first code may be generated from the first set of one or more pixels. The second set of one or more pixels may be overlaid with an image representing the first code. The first code may be encoded into in a standard metadata location.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Various disclosed embodiments are illustrated by way of example, and not of limitation, by referring to the accompanying drawings, in which:

FIG. 5 is a flowchart illustrating an exemplary method for encoding a digital image;

FIG. 10 is a flowchart further illustrating an exemplary method for encoding image data;

FIG. 13 is a flowchart illustrating an exemplary method for further encoding a digital image;

4

Figure 16:
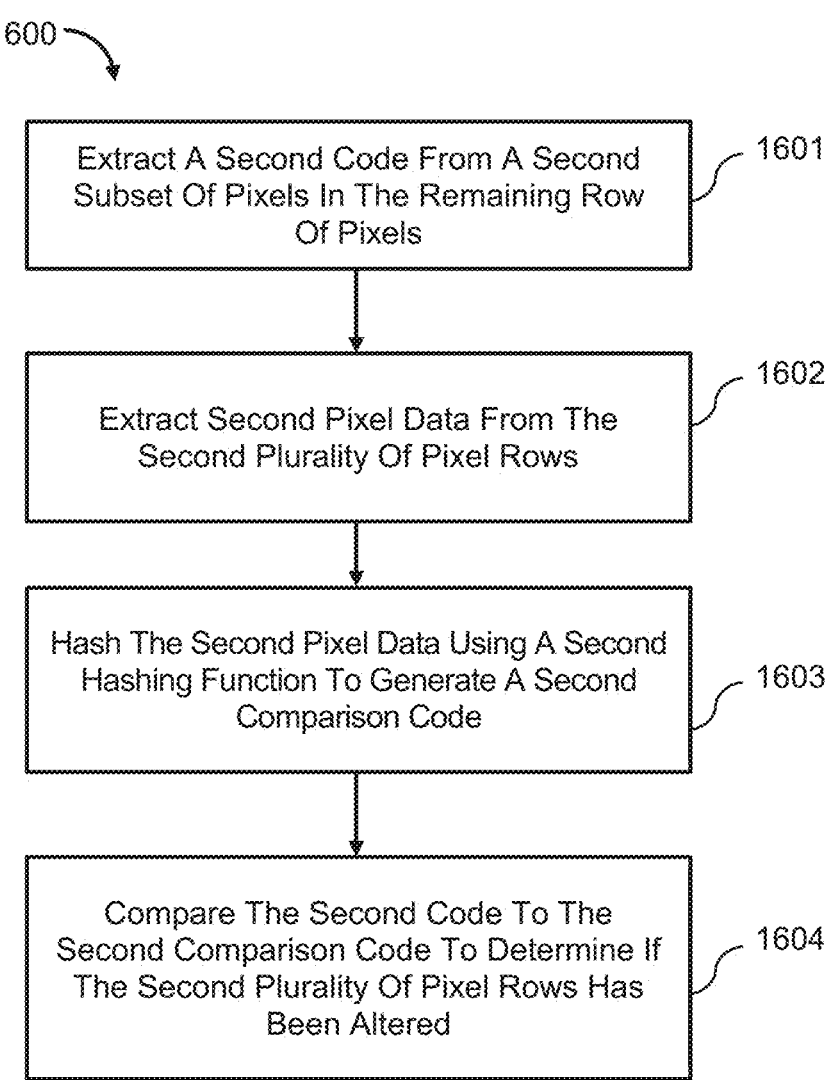
Figure 17:
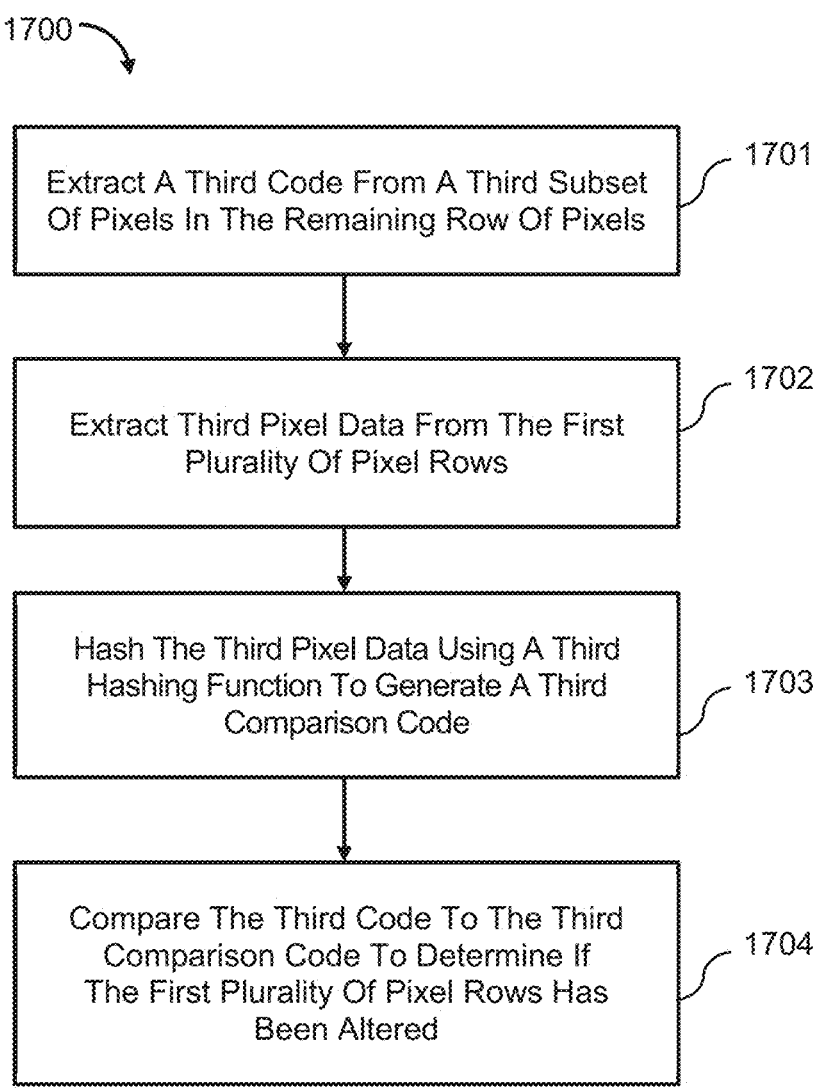
Figure 19:
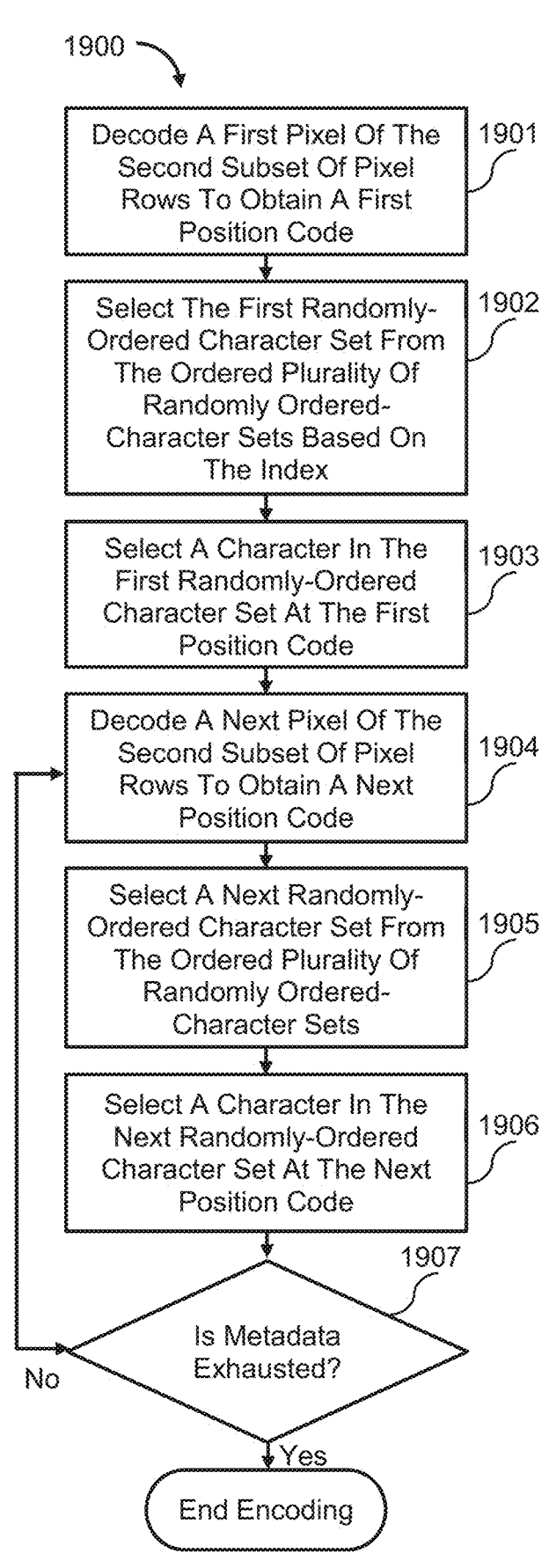

FIG. 16 is a flowchart further illustrating the exemplary method for authenticating an encoded digital image;

FIG. 17 is flowchart further illustrating the exemplary method for authenticating an encoded digital image;

FIG. 18 is a flowchart further illustrating the exemplary method for authenticating an encoded digital image;

FIG. 19 is a flowchart illustrating an exemplary method for verifying metadata;

FIG. 20 is a flowchart illustrating an exemplary method for encoding a digital image to facilitate subsequent authentication;

FIG. 21 is a flowchart illustrating an exemplary method for encoding a digital video to facilitate subsequent authentication;

FIG. 22 is a flowchart illustrating an exemplary method for encoding a digital image to facilitate subsequent authentication;

FIG. 23 is a flowchart illustrating an exemplary method for encoding a digital image to facilitate subsequent authentication; and FIG. 24 is a flowchart illustrating an exemplary method for encoding a digital image to facilitate subsequent authentication.

DETAILED DESCRIPTION

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

It will be appreciated that for ease of explanation, digital image processing operations are described herein as operating "on" or "in" a digital image (e.g., encoding or decoding pixels, replacing rows of pixels, etc.). It will be understood by a person of ordinary skill in the art that such operations may be performed as file operations using data representations of the digital images that may be stored in memory and various data structures, image buffers, registers, and the like.

Additionally, terms such as "random," "random-selected," "randomly-ordered," and the like are used throughout the following description. It will be appreciated that such terms may refer to random processes or pseudorandom processes, which are random-like but nevertheless deterministic. A process for selecting numbers or values may rely on a truly random physical phenomenon such as sampled electrical noise. Additionally, it is known in the art that a pseudorandom sequence of any arbitrary length, using any arbitrary set of numbers or characters, can be generated using registers, adders, and feedback.

Figure 1:
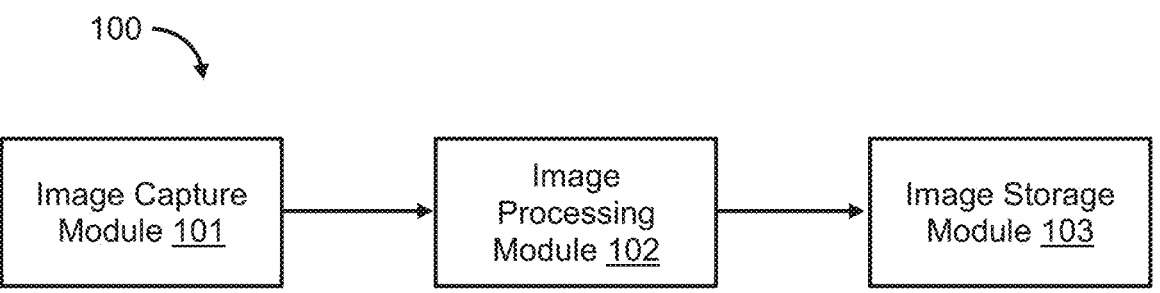
FIG. 1 illustrates an exemplary image encoding apparatus.

FIG. 1 is a block diagram of an exemplary digital image encoding apparatus 100. Apparatus 100 includes an image capture module 101, an image processing module 102 and an image storage module 103. Image capture module 101 may be any type of digital imaging device or system such as, for example, a digital camera or a smartphone or cellphone equipped with a digital camera. In certain embodiments, image capture module 101 may also include a GPS receiver to provide location information and wireless connectivity to time servers and or reverse geocode servers to provide GPS to address translation. Image processing module 102 may include hardware, software and firmware to manipulate a digital image from the image capture module 101 to encode the digital image according to the methods described herein. Image storage module 103 may be any type of digital storage device or medium capable of storing a digital image file. Image storage module 103 may also be wirelessly connected to other systems, such as remote file servers, so that encoded digital images may be transmitted to other locations for authentication.

Machine-readable instructions may be executable to establish verification addresses on a block chain. Generally speaking, a block chain is a transaction database shared by some or all nodes participating in system 100. Such participation may be based on the Bitcoin protocol, Ethereum protocol, and/or other protocols related to digital currencies and/or block chains. A full copy of the block chain contains every transaction ever executed in an associated digital currency. In addition to transactions, other information may be contained by the block chain, such as described further herein.

The block chain may be based on several blocks. A block may include a record that contains and confirms one or more waiting transactions. Periodically (e.g., roughly every one minute), a new block including transactions and/or other information may be appended to the block chain. In some implementations, a given block in the block chain contains a hash of the previous block. This may have the effect of creating a chain of blocks from a genesis block (i.e., the first block in the block chain) to a current block. The given block may be guaranteed to come chronologically after a previous block because the previous block's hash would otherwise not be known. The given block may be computationally impractical to modify once it is included in the block chain because every block after it would also have to be regenerated.

Figure 2:
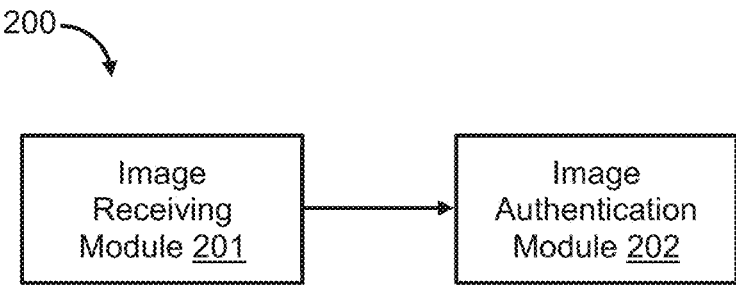
FIG. 2 illustrates an exemplary image authentication apparatus.

FIG. 2 is a block diagram of an exemplary image authentication apparatus 200. Image authentication apparatus 200 includes an image receiving module 201 and an image authentication module 202. Image receiving module 201 may be any system or apparatus capable of receiving a digital image file on a digital storage medium or via a wired or wireless connection, and providing the digital image file to image authentication module 202 for subsequent processing, including the image authentication methods described herein.

Figure 3:
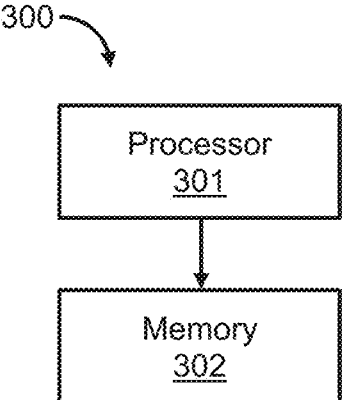
FIG. 3 illustrates an exemplary processor and memory system that can be configured to implement elements of the exemplary image encoding apparatus of FIG. 1 and the exemplary image authentication apparatus of FIG. 2.

FIG. 3 is a block diagram of a system 300 that may be used to implement any of modules 101, 102, 103, 201, and 202. System 300 includes a processor 301 and a memory 302. Memory 302 may include stored instructions for performing any of the operations for encoding and authenticating digital images described herein, and processor 301 may be configured to execute the stored instructions.

In one embodiment, a method for encoding a digital image begins by capturing the image with, for example, a smartphone. The image may have any preset resolution, but for the purpose of the present description, it is assumed that the image is a 600 pixel by 800 pixel RGB encoded image. That is, the image is 600 pixels wide and contains 800 rows of pixels. As is known in the art, each pixel may be encoded using three 8-bit bytes of data, one byte each for RED, GREEN and BLUE luminosity. This system provides for $256^3$ or 16, 777,216 combinations. Conventionally, an RGB color code of (0,0,0) represents pure black (zero luminosity) while an RGB color code of (255,255,255) represents pure white of the highest luminosity. That convention will be used throughout the following description.

As will be described in greater detail below, embodiments of the encoding methodology employed herein uses a limited number of RGB color codes to embed a corresponding limited number of characters into a digital image. In particular, the limited number of characters may be encoded into the "lowest" RGB color codes. For example, if the character set is a standard 128 character ASCII character set, then all 128 characters could be coded with RGB color codes from (0,0,1) through (0,0,128) in base 10. However this coding scheme would produce pixels with no RED or BLUE luminosity and steadily increasing GREEN luminosity (up to 50% of maximum) with higher numbered character codes. Such coding could easily be visually perceived by a human observer, revealing an aspect of the encoding scheme.

Alternatively, the decimal character codes can be expressed in a lower base numbering system. For example, a three-digit base-n numbering system is capable of coding $n^3$ codes. For n=5, it is possible to uniquely code up to 125 characters in base-5 RGB color codes from $(0,0,0)5$ to $(4,4,4)5$, or 124 codes from $(0,0,1)5$ through $(4,4,4)5$ where the subscript 5 indicates the base. Accordingly, all but 4 of the standard ASCII characters can be encoded into RGB color codes in a base 5 numbering system and, advantageously, will be indistinguishable from black to the naked eye at such low intensities. It will be appreciated that lower or higher base number may be used to accommodate lower or higher numbers of characters.

As will be described in greater detail below, embodiments of the encoding methodology employed herein also use hashing functions operating on image data to generate multiple hash codes. Hash functions are known in the art and accordingly are not described in detail. A hash function is any function that can be used to map data of arbitrary size to data of fixed size, with slight differences in input data producing very big differences in output data. The values returned by a hash function are called hash values, hash codes, hash sums, or simply hashes. Hash values are commonly used to differentiate between data.

A cryptographic hash function is a deterministic procedure that takes an arbitrary block of data and returns a fixed-size bit string, the (cryptographic) hash value, such that an accidental or intentional change to the data will change the hash value. The data to be encoded is often called the "message", and the hash value is sometimes called the message digest or simply digest. The ideal cryptographic hash function has four main properties: (1) it is easy to compute the hash value for any given message, (2) it is infeasible to find a message that has a given hash, (3) it is infeasible to modify a message without changing its hash, and (4) it is infeasible to find two different messages with the same hash.

It is also know in the art that any "message" may be "salted" before it is hashed in order to provide additional security. A salt is random data that is used as an additional input to a one-way function that hashes a password or passphrase. The salt may be prepended, appended or interspersed within the message.

Figure 4:
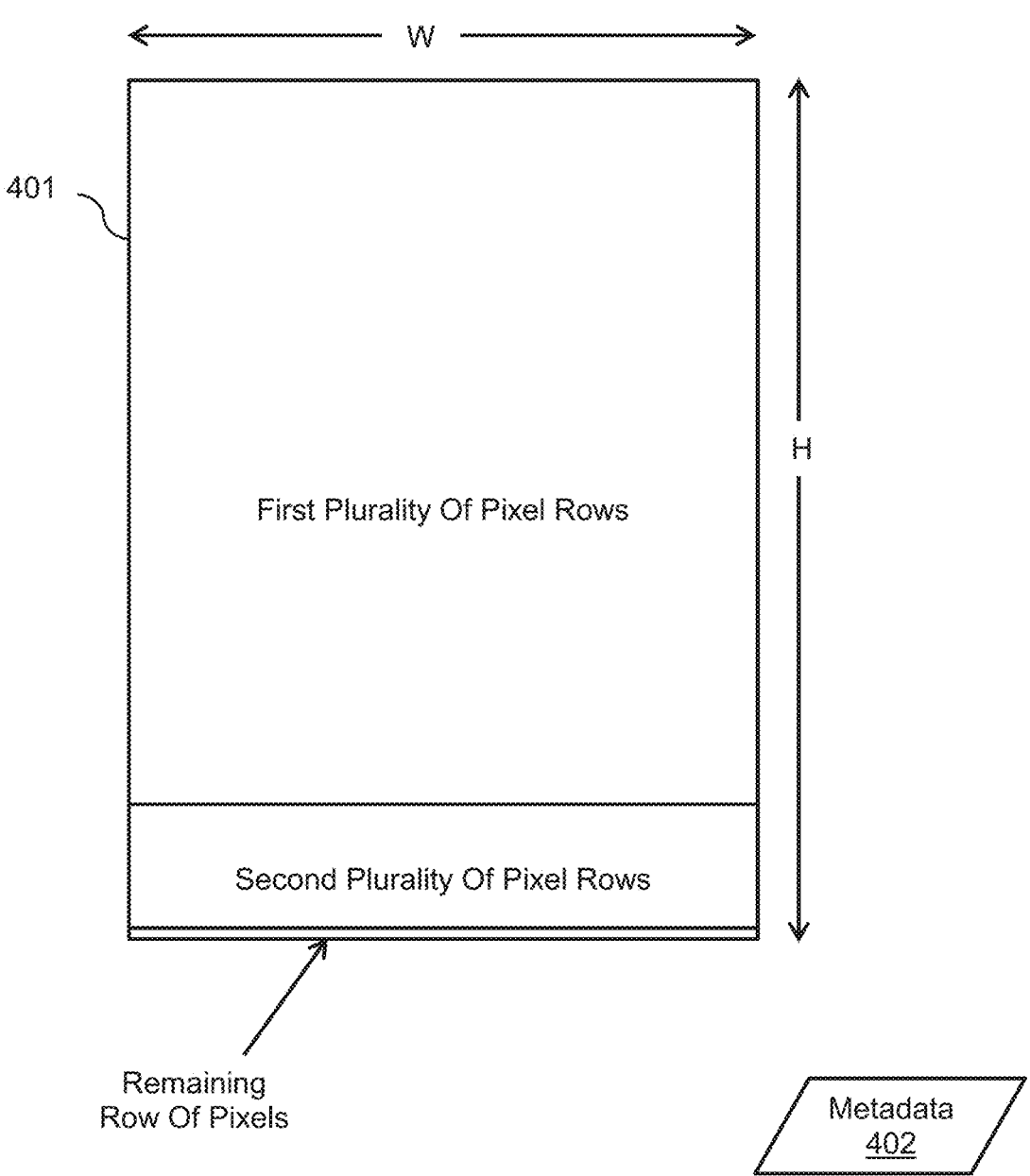
FIG. 4 illustrates an exemplary digital image and its associated metadata.

FIG. 4 is a simple representation of a captured digital image 400 having a width of W pixels and a height of H pixel rows, where the actual content of the image is not shown. As illustrated in FIG. 4, digital image 401 may be divided into three "working" areas: a first plurality of pixel rows, a second plurality of pixel rows, and a remaining row of pixels. While FIG. 4 illustrates the three working areas in an exemplary physical order, the arrangement is arbitrary. For example, the second plurality of pixel rows could be located at the top of the image and the remaining row of pixels could be located between the first plurality of pixel rows and the second plurality of pixel rows. Additionally, the remaining row could be more than one row. By way of example for the present description, it will be assumed that that width of the image W is 600 pixels, the height H of the image is 800 rows of pixels, the first plurality of pixel rows is 768 rows and the second plurality of pixel rows is 31 rows (leaving one remaining row).

The digital image 401 may be accompanied by metadata 402. For example, if the image encoding apparatus 100 includes GPS capability, the metadata 402 may include the GPS coordinates where of the digital image was captured. The metadata 402 may also include a GPS accuracy (e.g., if an enhanced GPS service is available), a date and time from a time server or a local clock, a date and time source name if the date and time data is obtained from a server, a device ID, a device operating system and version, a user ID, an organization ID, an assigned group name, and a reverse geocoded address if such a service is available to the image encoding apparatus via a wireless connection such as a cellular connection or a WiFi connection.

Figure 9:
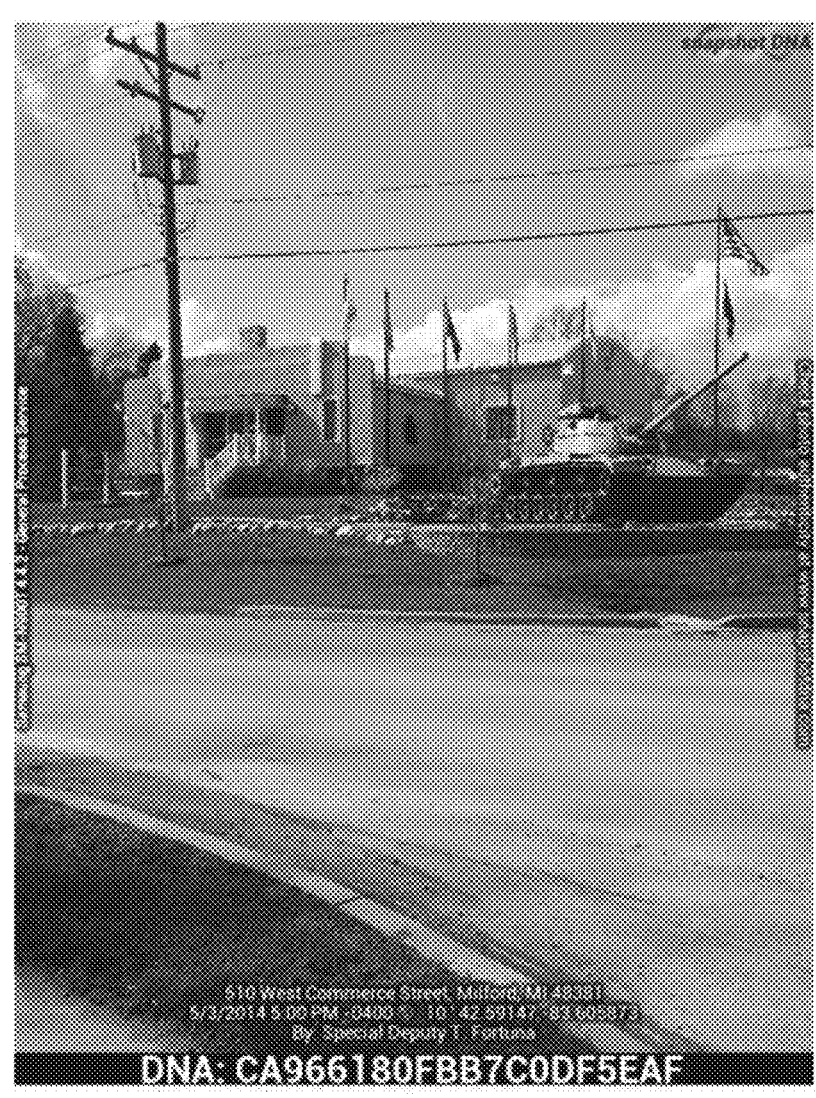
FIG. 9 illustrates an exemplary encoded image.

In one embodiment, some or all of the metadata may be used to overwrite portions of the first plurality of pixel rows as illustrated in FIG. 9 (which also illustrates the second plurality of pixels and the remaining row of pixels after encoding as described below).

FIG. 5 is a flowchart 500 illustrating an exemplary method for encoding a digital image. In operation 501, a digital image is captured, for example a 600×800 pixel image as described above. In operation 502, the digital image is partitioned into three working areas; a first plurality of pixels (e.g., 768 rows), a second plurality of pixel rows (e.g., 31 rows) and a remaining row of pixels (e.g., 1 row).

Figure 6:
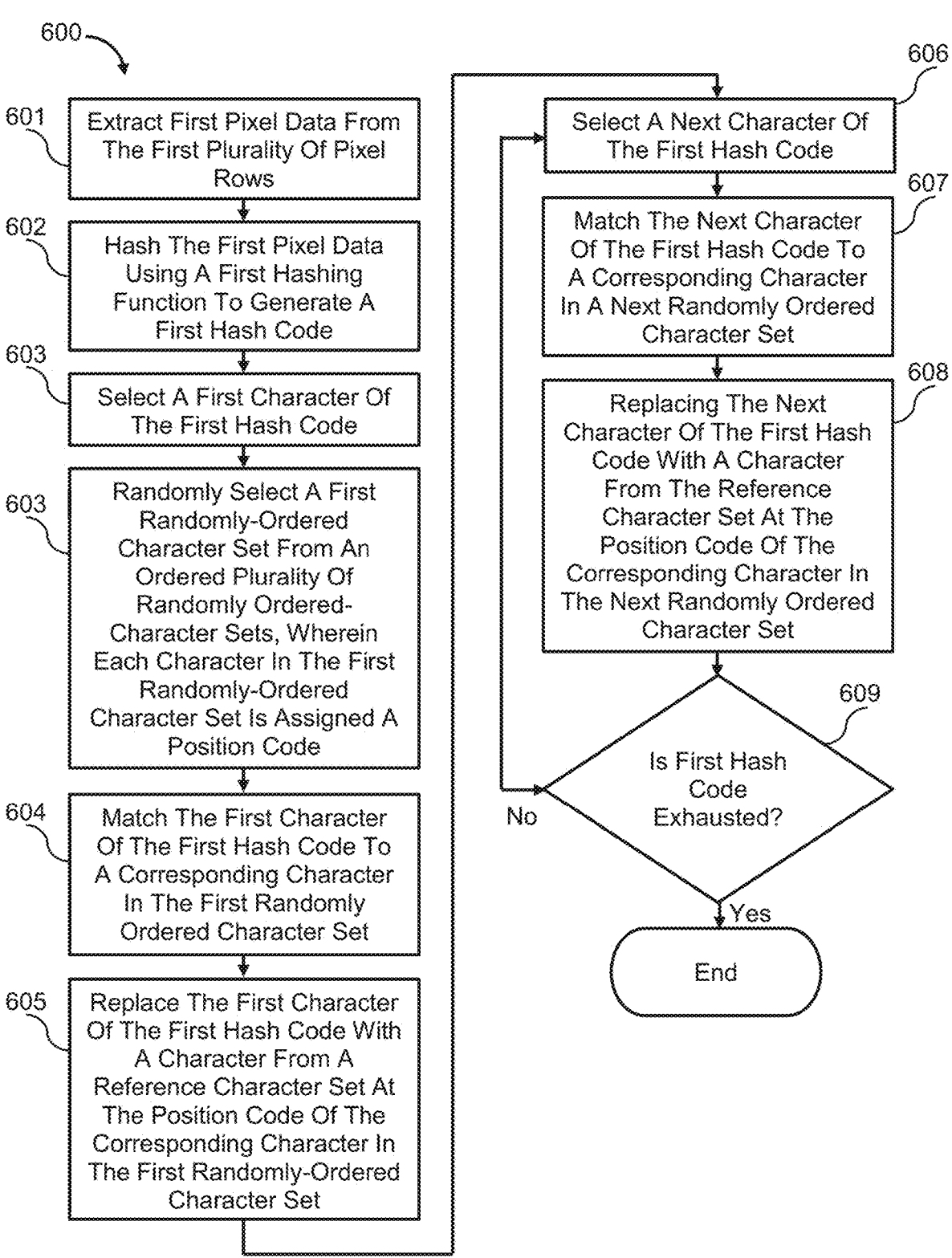
FIG. 6 is a flowchart illustrating an exemplary method for generating a code.

In operation 503, a first code is generated from the first plurality of pixels as illustrated in FIG. 6.

FIG. 6 is a flowchart 600 illustrating an exemplary method for generating the first code. In operation 601, pixel data (first pixel data) is extracted from the first plurality of pixels. For example, the 3-byte RGB data from each pixel may be extracted to a data buffer for subsequent operations. In operation 602, the first pixel data is hashed using a first hashing function to generate a first hash code. In operation 603, a first character of the first hash code is selected for encoding.

Figure 7:
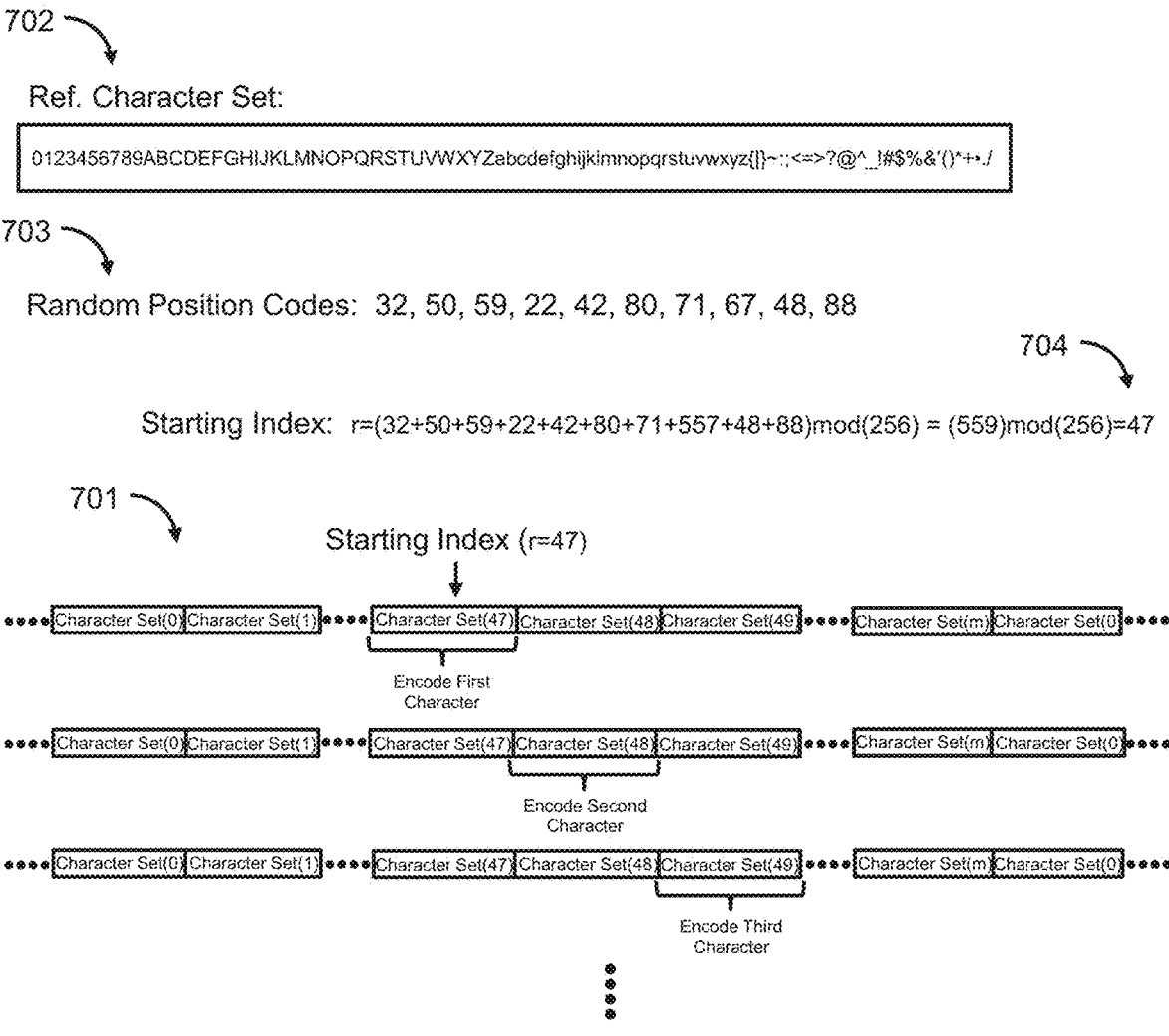
FIG. 7 illustrates a method for selecting character sets for encoding image data.
Figure 8:
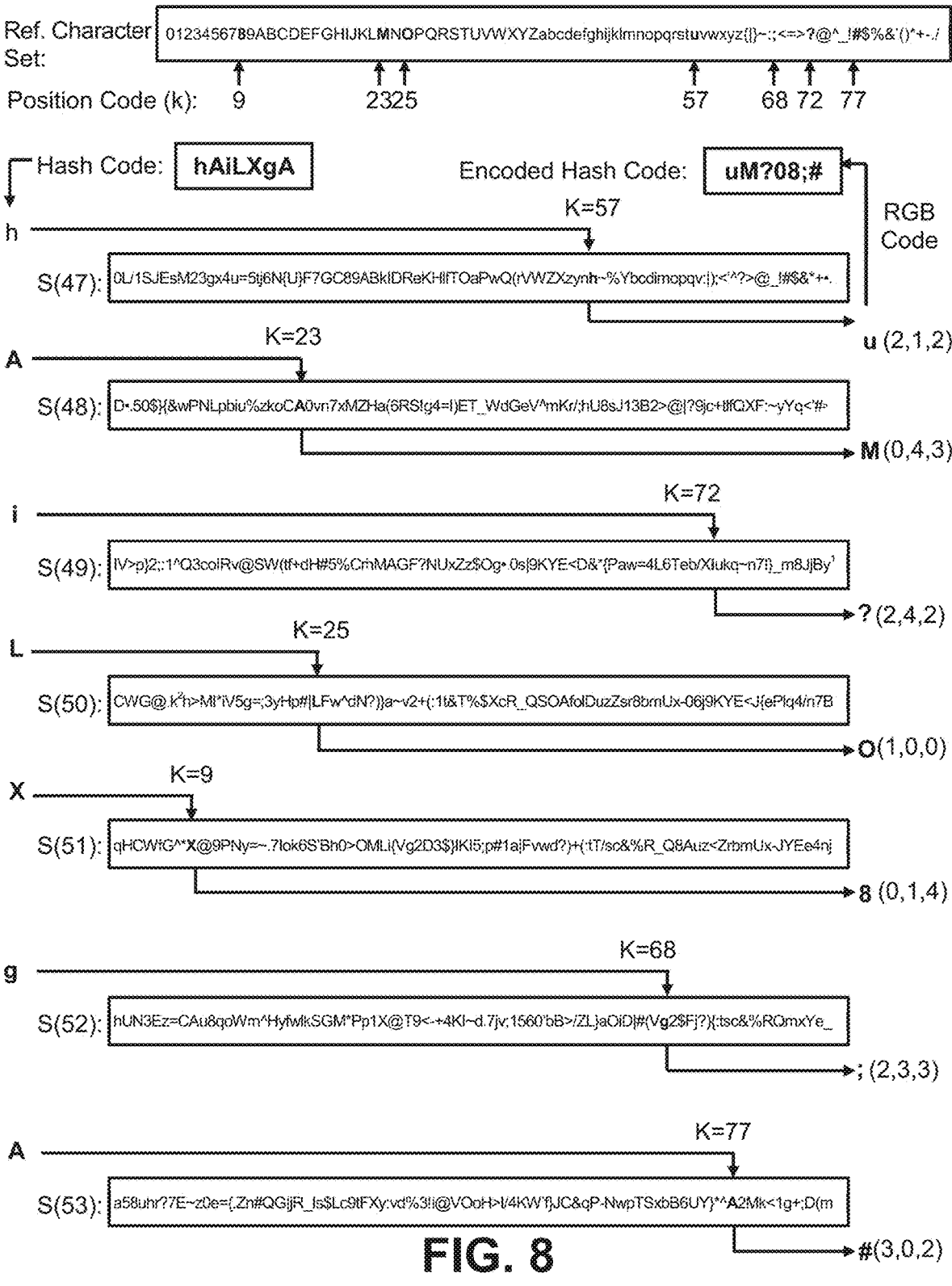
FIG. 8 further illustrates an exemplary method for encoding image data.

Aspects of character encoding include the use of a rotating buffer structure as illustrated in FIGS. 7 and 8. The rotating buffer 701 illustrated in FIG. 7 consists of m randomly—ordered character sets, each containing the same N number of characters (i.e., each character set includes the same set of characters in a random order). In one embodiment, each character set may contain N=88 randomly-ordered characters based on a reference character set and m may be 256. Each character in the reference character set has a position code from 1 to N and each character in each of the m randomly-ordered character sets also has a position code from 1 to N. It will be appreciated that because the character sets are randomized, the same character in two different character sets will typically have different position codes. An exemplary 88 character reference character set 702 is illustrated in FIG. 7. As a first encoding step, an index is calculated to select one of the m randomly-ordered character sets for encoding the first character of the first hash code. In one embodiment, R position codes (703) from 1 to N may be randomly selected as illustrated in FIG. 7. In the example illustrated, R=10 and the randomly selected position codes are {32, 50, 59, 22, 42, 80, 71, 67, 48, 88}. These position codes may be summed modulo m to obtain an index (704) to the character set that will be used to encode the first character of the first hash code. In the example illustrated in FIG. 7, m=256 and the summation modulo m=47. Accordingly, the index r=47 and the 47th character set in the rotating buffer is selected to encode the first character in the first hash code. As each subsequent character in the first hash code is selected for encoding, the index is increased by 1 to select the next character set in the buffer. This sequence is illustrated in FIG. 7 for the first three characters of the first hash code.

An exemplary encoding process is illustrated in FIG. 8. For the example illustrated in FIG. 8, the first hash code is assumed to be a 7-character hash code consisting of the characters {h, A, i, L, X, g, A}. The encoding process proceeds as follows. The first character in the first hash code (h) is located in the starting character set S(47) at position k=57. In the reference character set, position 57 is occupied by the character (u). Accordingly, the (h) is encoded as a (u), which can subsequently be encoded as a base-5 RGB color code of (2,1,2). The second character in the first hash code (A) is located in the next character set S(48) at position k=23. In the reference character set, position 23 is occupied by the character (M). Accordingly, the (A) is encoded as an (M), which can subsequently be encoded as a base-5 RGB color code of (0,4,3). The third character in the first hash code (i) is located in the next character set S(49) at position k=72. In the reference character set, position 72 is occupied by the character (?). Accordingly, the (i) is encoded as a (?), which can subsequently be encoded as a base-5 RGB color code of (2,4,2). The fourth character in the first hash code (L) is located in the next character set S(50) at position k=25. In the reference character set, position 25 is occupied by the character (O). Accordingly, the (L) is encoded as an (O), which can subsequently be encoded as a base-5 RGB color code of (1,0,0). Similarly, the remaining characters {X, g, A} in the first hash code are encoded as (8), (;) and (#) by using character sets S(51), S(52), and S(53), respectively.

Returning now to FIG. 6, operations 603-608 encompass the processes described above. In operation 603, a first randomly-ordered character set is randomly selected from an ordered plurality of randomly ordered-character sets, wherein each character in the first randomly-ordered character set is assigned a position code. In operation 604, the first character of the first hash code is matched to a corresponding character in the first randomly ordered character set. In operation 605, the first character of the first hash code is replaced with a character from a reference character set at the position code of the corresponding character in the first randomly-ordered character set. Operation 606 begins an iterative process wherein a next character in the first has code is selected for encoding; In operation 607, the next character of the first hash code is matched to a corresponding character in a next randomly ordered character set. In operation 608, the next character of the first hash code is replaced with a character from the reference character set at the position code of the corresponding character in the next randomly ordered character set. Operations 606-608 are repeated until all of the characters in the first hash code have been encoded, therefore generating the first code.

It will be appreciated that additional operations may be performed on the first code to provide additional levels of encoding and encryption. For example, the encoded characters in the first code may be translated and/or transposed according to a predetermined algorithm. Such algorithms are known in the art and, accordingly, are not described in detail herein.

Figure 11A:
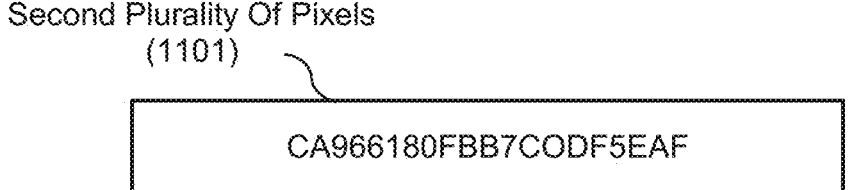
FIG. 11A illustrates an exemplary segment of an encoded image.

Returning now to FIG. 5, the exemplary method for encoding a digital image continues in one embodiment at operation 504 where a second code is generated from the second plurality of pixel rows. Operation 504 is expanded in FIG. 10, in a flowchart 1000 illustrating an exemplary method for generating the second code. In a preliminary operation 1001, each pixel in the second plurality of pixel rows may be initialized to a predetermined value, such as RGB color code (0,0,0) to render the pixels pure black. Next, in operation 1002, the second plurality of pixel rows is partitioned into a first subset of pixel rows and a second subset of pixel rows. Continuing the example from above, where the second plurality of pixel rows includes 31 pixel rows, the first subset of pixel rows may include a contiguous 27 rows and the second subset may include the remaining four rows, which may be distributed in any convenient manner above, below or both above and below the first subset. Next, in operation 1003, the second plurality of pixel rows is overlaid with an image of the first code. Such an overwrite is illustrated in FIG. 11A for the exemplary case where the first code comprises a 20-character encoded hash code (e.g., CA966180FBB7C0DF5EAF in the example of FIG. 11A) generated using the method illustrated in FIG. 8. Methods for overwriting digital image files with characters are known in the art and are not described in detail herein. Generally understood methods include initializing a field of pixels (e.g., the second plurality of pixels) to an initial color (e.g., RGB (0,0,0) for black) and then using a character generator to map characters to the initialized field with a contrasting color (e.g., RGB (255,255,255) for white).

Figure 11B:
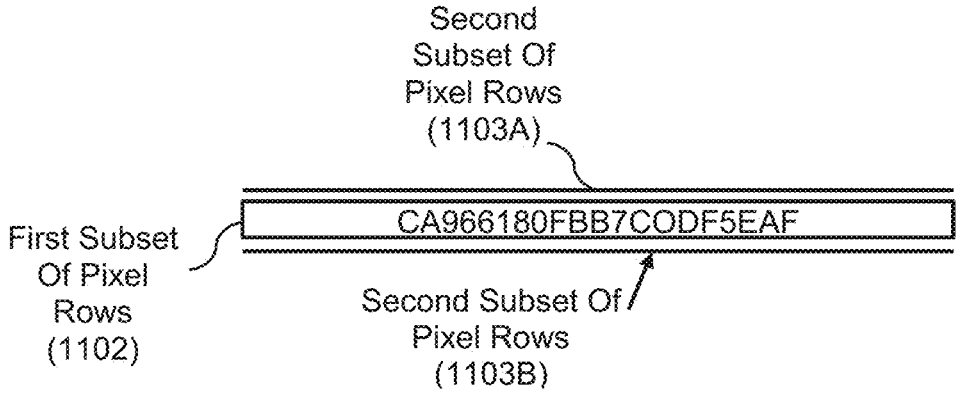
FIG. 11B illustrates another exemplary segment of an encoded image.

FIG. 11B graphically illustrates the partitioning of the second plurality of pixel rows 1101 into the first subset 1102 and the second subset 1103A and 1103B. Next, in operation

Figure 12:
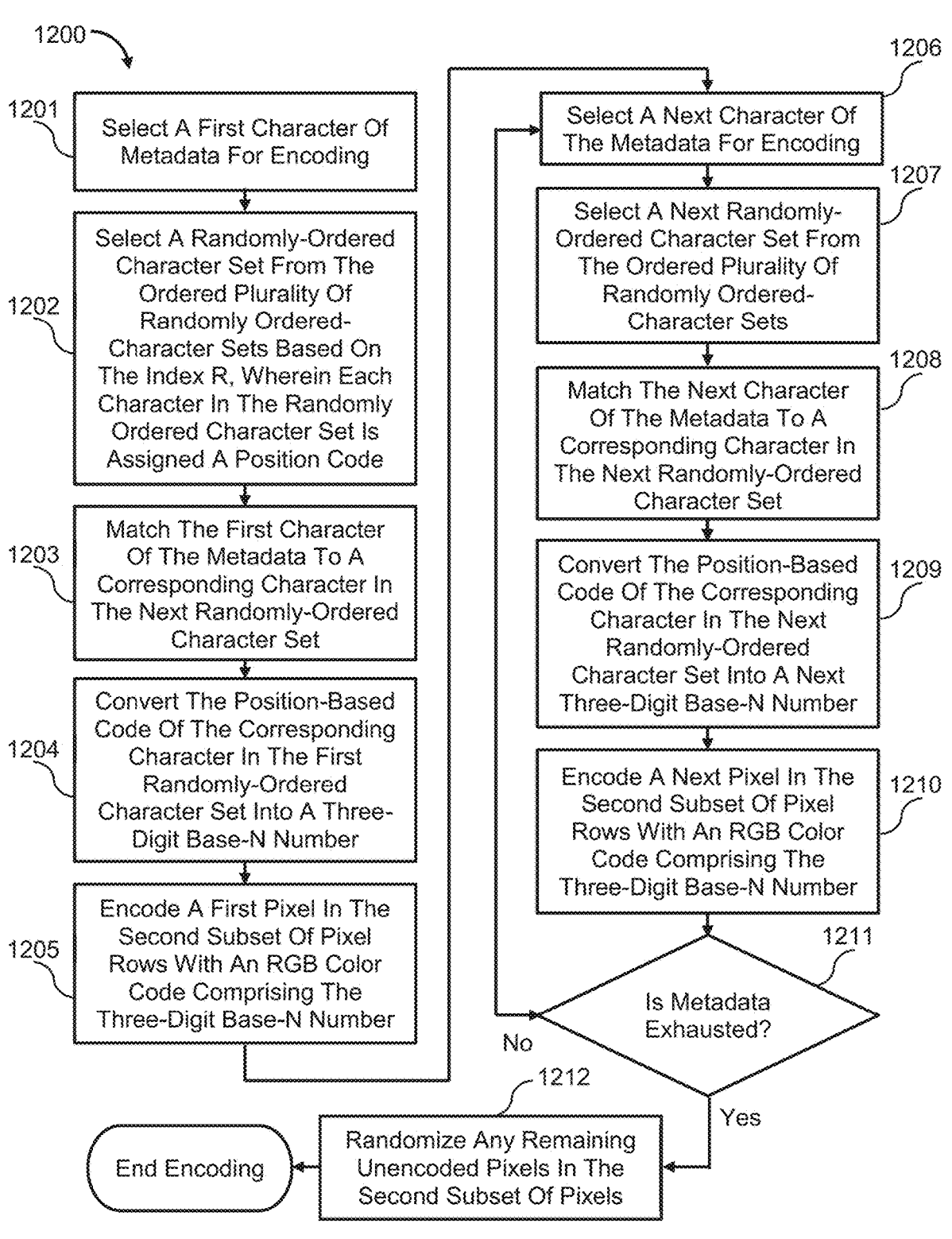
FIG. 12 is a flowchart illustrating an exemplary method for encoding metadata.

1004, some or all of the metadata 402 may be encoded into the second subset of pixels, as illustrated in FIG. 12.

FIG. 12 is a flowchart 1200 illustrating an exemplary method for encoding the metadata 402 into the second plurality of pixels, which method closely parallels the previously described method for encoding the first hash code. The method begins at operation 1201, where a first character of the metadata is selected for encoding. In operation 1202, a randomly-ordered character set from the ordered plurality of randomly ordered-character sets is selected based on the index r, wherein each character in the randomly ordered character set is assigned a position code.

In operation 1203, the first character of the metadata is matched to a corresponding character in the next randomly-ordered character set. In operation 1204, the position-based code of the corresponding character in the first randomly-ordered character set is converted into a three-digit base-n number (e.g., a 3-digit base-5 number). In operation 1205, a first pixel in the second subset of pixel rows is encoded with an RGB color code comprising the three-digit base-n number.

In operation 1206, a next character of the metadata is selected for encoding. In operation 1207, a next randomly-ordered character set is selected from the ordered plurality of randomly ordered-character sets. In operation 1208, the next character of the metadata is matched to a corresponding character in the next randomly-ordered character set. In operation 1209, the position-based code of the corresponding character in the next randomly-ordered character set is converted into a next three-digit base-n number. In operation 1210, a next pixel in the second subset of pixel rows is encoded with an RGB color code comprising the three-digit base-n number. These operations are iterated until the metadata is exhausted (operation 1211), wherein any remaining unencoded pixels in the second subset of pixels are randomized by encoding the pixels with random 3-digit base-n RGB color codes.

Returning to FIG. 10, the next operation for generating the second code is operation 1005, where any remaining unencoded pixels in the second plurality of pixel rows are randomized by encoding the pixels with random 3-digit base-n RGB color codes. In operation 1006, pixel data (second pixel data) from the second plurality of pixel rows is extracted and, in operation 1007, the second pixel data is hash using a second hashing function to generate the second code. As in the case of the first code, the second code may be further encoded and/or encrypted using predetermined translation and transposition algorithms as are known in the art.

Returning now to FIG. 5, the next operations in encoding the digital image 401 is operation 505, where a third code is generated based on the first code and the second code, and operation 506, where the first code, the second code and the third code are encoded into the remaining row of pixels. Operations 505 and 506 are expanded in FIG. 13.

Figure 14A:
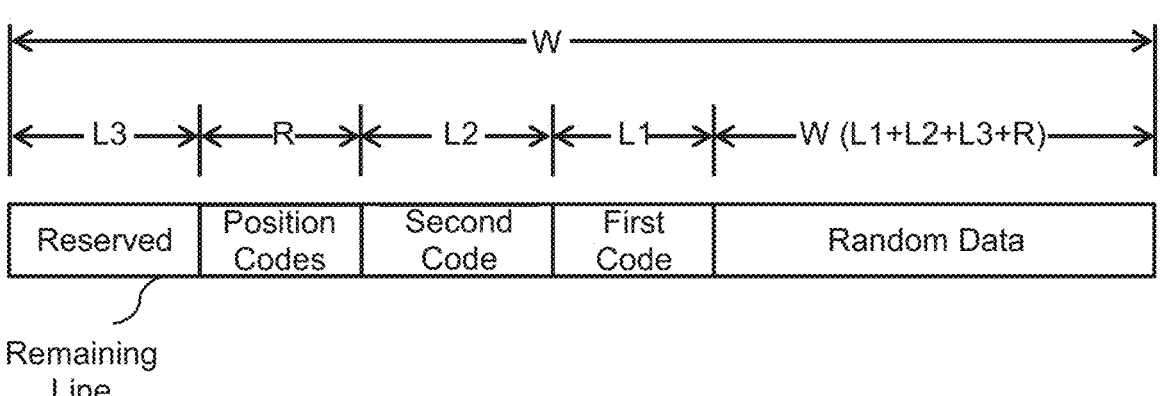
FIG. 14A illustrates another exemplary segment of an encoded image.
Figure 14B:
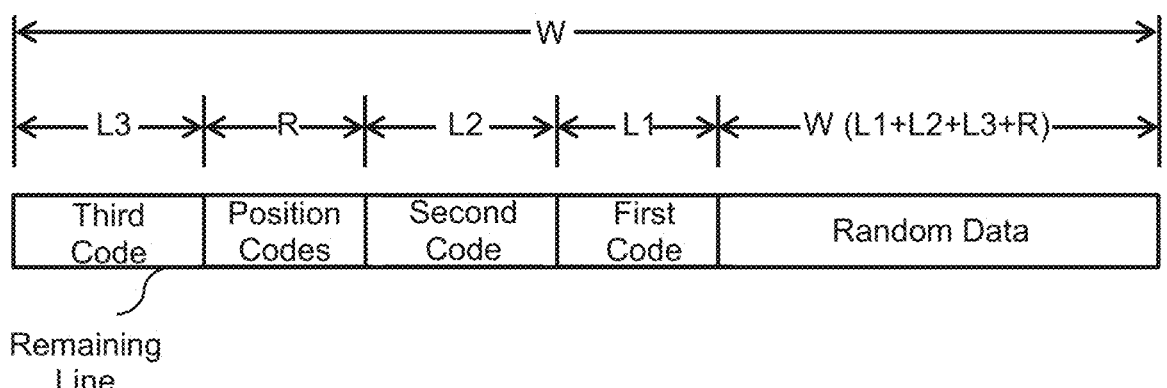
FIG. 14B illustrates another exemplary segment of an encoded image.

FIG. 13 is a flowchart 1300 illustrating the generation of the third code and the encoding of the remaining row of pixels. In operation 1301, all pixels in the remaining row are encoded with RGB color codes based on random 3-digit base-n numbers (e.g., base-5). In operation 1302, a first subset of pixels is reserved in the remaining row of pixels for the third code, where a hashing function with a known output length is predetermined (e.g., a 20 character output). In operation 1303, the first code, the second code and the R position codes are encoded as 3-digit base-n RGB color codes into predetermined pixel locations in the remaining row of pixels. The configuration of the remaining row after operation 1303 is illustrated in FIG. 14, where the width of the remaining line is W pixels, the length of the first code is L1, the length of the second code is L2, and the length of the third code will be L3. In an exemplary embodiment, W=600, R=10, and L1=L2=L3=20, such that the first 530 pixels of the remaining row are encoded with random, base-n RGB color codes. It will be appreciated that the codes may be encoded in any locations. All that is required is that the authentication algorithm (described below) is aware of the locations. Returning to FIG. 13, in operation 1304, a concatenated string of pixel data comprising the coded values of the R position codes, the L1 first code characters, the L2 second code characters and the random characters, are hashed using a third hashing function to generate the third code. In operation 1305, the L3 characters of the third code are encoded into the reserved pixels of the remaining row as 3-digit base-n RGB color codes. FIG. 14B illustrates the configuration of the remaining row of pixels after operation 1305 is completed. FIG. 9 illustrates an exemplary digital image that has been encoded according to the methods described above.

Figure 15:
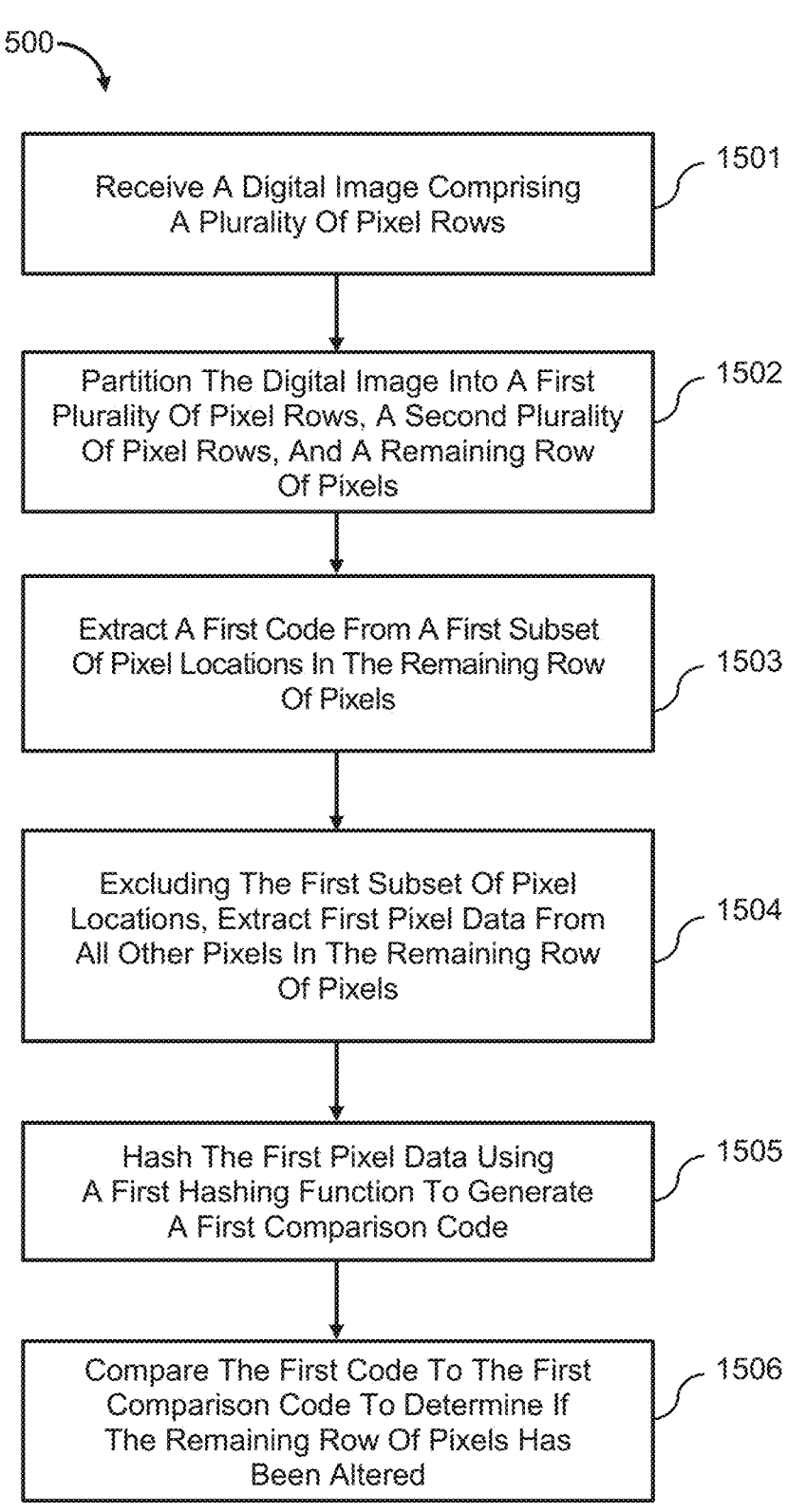
FIG. 15 is a flowchart illustrating an exemplary method for authenticating an encoded digital image.

FIGS. 14, 15 and 16 illustrate exemplary methods that may be performed by the authentication apparatus 200 for authenticating digital images that have been encoded using the methods described above. It will be appreciated that the authentication process relies on a prior knowledge of the hashing functions, the reference character set, the ordering of the character sets in the rotating buffer, the number and location of pixel rows in the second plurality of pixel rows and the remaining row of pixels, and the lengths and locations in the remaining row of the R position codes, the L1 characters in the first code, the L2 characters in the second code, and the L3 characters in the third code.

FIG. 15 is a flowchart 1500 illustrating the use of the third code to authenticate the digital image. In operation 1501, the encoded digital image is received by the image receiving module 201 and delivered to the image authentication module 202. In operation 1502, the authentication module 202 partitions the digital image into the first plurality of pixel rows, the second plurality of pixel rows and the remaining row as illustrated in FIG. 4. In operation 1503, the third code (a first code in the authentication process) is extracted from its location in the remaining row of pixels (a first subset of pixel locations in the authentication process). Next, in operation 1504, the encoded data from all other pixels in the remaining row are extracted as first pixel data. In operation 1505, the first pixel data is hashed using the third hashing function (first hashing function in the authentication process) to generate a first comparison code. In operation 1506, the third code and the first comparison code are compared to determine if the remaining row of pixels has been altered.

FIG. 16 is a flowchart 1600 illustrating the use of the second code to authenticate the digital image. In operation 1601, the second code is extracted from its location in the remaining row of pixels (a second subset of pixels locations in the authentication process). Next, in operation 1602, the pixel data from the second plurality of pixel rows is extracted as second pixel data. In operation 1603, the second pixel data is hashed using the second hashing function to generate a second comparison code. In operation 1604, the second code is compared with the second comparison code to determine if the second plurality of pixel rows has been altered.

FIG. 17 is a flowchart 1700 illustrating the use of the first code to authenticate the digital image. In operation 1701 the first code (third code in the authentication process) is extracted from its location in the remaining row of pixels (third subset of pixels in the authentication process). In operation 1702, pixel data from the first plurality of pixel rows is extracted as third pixel data in the authentication process. In operation 1703, the third pixel data is hashed using the first hashing function (third hashing function in the authentication process) to generate a third comparison code. In operation 1704, the first code is compared to the third comparison code to determine if the first plurality of pixel rows has been altered.

In one embodiment, if alteration to the first or second plurality of pixel rows is detected, it is possible to determine if the alteration has tampered with the overlaid metadata in the first plurality of pixel rows or with the encoded metadata in the second plurality of pixel rows. FIGS. 18 and 19 illustrate how this process is conducted.

FIG. 18 is a flowchart 1800 illustrating an exemplary method for extracting metadata from the second plurality of pixel rows. The method begins with operation 1801, where the R position codes are extracted from their location in the remaining row of pixels (fourth subset of pixels in the authentication process). In operation 1802, the position codes are decoded to obtain the R position codes, and the position codes are summed modulo m to obtain the index r to the first randomly-ordered character set used to encode the metadata during the encoding process described above. In operation 1803, the second plurality of pixel rows is partitioned into the first subset of pixel rows in the second plurality of pixel rows, and the second subset of pixel rows in the second subset of pixel rows. In operation 1804, pixel data (containing the encoded metadata) is extracted from the second subset of pixel rows. In operation 1805, the metadata is decoded as detailed in FIG. 19.

FIG. 19 is a flowchart 1900 illustrating an exemplary method for decoding the metadata. In operation 1901, a first pixel of the metadata is decoded to obtain a first position code. In operation 1902, the first randomly-ordered character set is selected based on the index. In operation 1903, the character in the first randomly-ordered character set at the first position code is selected. In operation 1904, a next pixel of the second subset of pixels is decoded to obtain a next position code. In operation 1905, a next randomly-ordered character set is selected, and in operation 1906, the character in the next randomly-ordered character set at the next position code is selected. The sequence of operations 1904-1906 is repeated until the metadata is exhausted (operation 1907). The end of the metadata may be detected when an end-of-data character is decoded from the second subset of pixels.

After the metadata is decoded it may be compared with the printed metadata in the first plurality of pixels to identify any differences in the two data sets.

FIG. 20 is a flowchart 2000 illustrating an exemplary method for encoding a digital image to facilitate subsequent authentication. In operation 2001, one or more sanity checks are performed prior to encoding a digital image in order eliminate a limited set of possibilities of adulteration of the digital image. In operation 2002, a digital image comprising a plurality of pixels is captured. In operation 2003, the digital image is partitioned into two or more working areas. The two or more working areas include a first working area having a first set of one or more pixels and a second working area having a second set of one or more pixels. In operation 2004, a first code is generated from the first set of one or more pixels. In operation 2005, the second set of one or more pixels is overlaid with an image representing the first code. In operation 2006, the first code is encoded into the second set of one or more pixels, wherein the digital image is overlaid with identifying information and/or embedded with metadata.

In some embodiments, performing the one or more sanity checks includes evaluating coherence of the metadata to determine if the digital image has been altered or spoofed. Performing the one or more sanity checks may include evaluating properties of the digital image. The properties of the digital image may include one or more of date information, time information, location information, GPS coordinates, image dimensions, and/or exchangeable image file format (EXIF) data. Performing the one or more sanity checks may include detecting suspicious exchangeable image file format (EXIF) data tags.

FIG. 21 is a flowchart 2100 illustrating an exemplary method for encoding a digital video to facilitate subsequent authentication. In operation 2101, a digital video is captured comprising a plurality of digital images displayed in succession at a constant or variable rate. Each of the plurality of digital images comprises a plurality of pixels. For a given digital image of the plurality of digital images, several operations are performed. In operation 2102, the given digital image is partitioned into two or more working areas. The two or more working areas include a first working area having a first set of one or more pixels and a second working area having a second set of one or more pixels. In operation 2103, a first code is generated from the first set of one or more pixels. In operation 2104, the second set of one or more pixels is overlaid with an image representing the first code. In operation 2105, the first code is encoded into the second set of one or more pixels, wherein the given digital image is overlaid with identifying information and/or embedded with metadata.

In some embodiments, individual ones of the plurality of digital images include one or more of GPS coordinates signifying where the digital video was captured, GPS accuracy data, a date and time from a time server or a local clock, a device ID, a device operating system and version, a user ID, an organization ID, an assigned group name, a reverse geocoded address, facial recognition data, speech recognition data, automatic transcription data, and/or other metadata. The entire digital video may be encoded into a single digital image. The single digital image may be identified randomly within the plurality of digital images in order to hide the encoding. In some embodiments, every digital image is encoded. In some embodiments, every Xth digital image is encoded, X being an integer greater than or equal to two.

FIG. 22 is a flowchart 2200 illustrating an exemplary method for encoding a digital image to facilitate subsequent authentication. In operation 2201, a digital image comprising a plurality of pixels is captured. In operation 2202, the digital image is partitioned into two or more working areas. The two or more working areas include a first working area having a first set of one or more pixels and a second working area having a second set of one or more pixels. In operation 2203, a first code is generated from the first set of one or more pixels. In operation 2204, the second set of one or more pixels is overlaid with an image representing the first code. In operation 2205, the first code is encoded into the second set of one or more pixels. The digital image is overlaid with identifying information and/or embedded with metadata. Encoding the first code includes utilizing asymmetric cryptographic keypairs having a public key and a private key.

In some embodiments, encoding the first code utilizing asymmetric cryptographic keypairs having a public key and a private key may include creating a cryptographic hash of the digital image. Encoding the first code utilizing asymmetric cryptographic keypairs having a public key and a private key may include performing image processing on the cryptographic hash to produce an image hash. Encoding the first code utilizing asymmetric cryptographic keypairs having a public key and a private key may include computing a signature of the image hash with the metadata utilizing the private key. Encoding the first code utilizing asymmetric cryptographic keypairs having a public key and a private key may include embedding the signature into the image.

FIG. 23 is a flowchart 2300 illustrating an exemplary method for encoding a digital image to facilitate subsequent authentication. In operation 2301, a digital image comprising a plurality of pixels is captured. In operation 2302, the digital image is partitioned into two or more working areas. The two or more working areas include a first working area having a first set of one or more pixels and a second working area having a second set of one or more pixels. In operation 2303, a first code is generated from the first set of one or more pixels. In operation 2304, the second set of one or more pixels is overlaid with an image representing the first code. In operation 2305, the first code is encoded into the second set of one or more pixels. The digital image is overlaid with identifying information and/or embedded with metadata. In operation 2306, the first code is stored on a blockchain to create a permanent timestamped digital record of the first code. The first code is stored on the blockchain such that the first code can be later associated with the digital image.

In some embodiments, the encoding may include uploading a cryptographic hash of the image with obfuscated metadata to the blockchain processing network. The blockchain processing network may be searched for the cryptographic hash. Responsive to the cryptographic hash not being found, the image may be reported as not being authentic. Responsive to the cryptographic hash being found, the metadata may be flagged as un-obfuscated.

FIG. 24 is a flowchart 2400 illustrating an exemplary method for encoding a digital image to facilitate subsequent authentication. In operation 2401, a digital image comprising a plurality of pixels is captured. In operation 2402, the digital image is partitioned into two or more working areas. The two or more working areas include a first working area having a first set of one or more pixels and a second working area having a second set of one or more pixels. In operation 2403, a first code is generated from the first set of one or more pixels. In operation 2404, the second set of one or more pixels is overlaid with an image representing the first code. In operation 2405, the first code is encoded into in a standard metadata location. In some embodiments, the metadata is encoded in a row of pixels.

It will be appreciated that the methods described herein, and their associated apparatus and computer program products may be modified by those of skill in the art while retaining the inventive features. For example, rather than recruiting rows from the original digital image for the second plurality of pixel rows and the remaining row of pixels by partitioning the original digital image, rows could be added to the original digital image to provide for the second plurality of pixel rows and the remaining row. In one embodiment, the second plurality of rows could be omitted entirely, such that the remaining row is encoded with the first code and the third code, but not the second code.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. Therefore, the disclosed embodiments can be implemented on non-transitory computer readable media. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, in some embodiments, the steps and/or actions of a method or algorithm may reside as one or any combination or set of codes and/or instructions on a machine readable medium and/or computer readable medium, which may be incorporated into a computer program product.

In some embodiments, the authentication process as described herein may include performing sanity checks. Sanity checks may include evaluating the coherence of the metadata and/or other information associated with a digital image to maintain the efficacy of the digital image data and determine if the digital image has been altered or spoofed. An altered image may include digital image manipulation, photo editing, digital image correction and enhancement (Digital ICE), and/or other type of image altering. A spoofed image may include a captured image modified such that the image appears normally but has been modified with the purpose to circumvent security mechanisms and/or fraudulently represent the captured image.

Sanity checks may include evaluating properties of the digital image. Examples of such properties may include one or more of date information, time information, location information, GPS coordinates, image dimensions, Exchangeable image file format (EXIF) data, and/or other metadata. Date and time information may include the date and/or time the digital image was captured, date & time from trusted outside time server, and/or other date and time information. Location information may include information to verify where the photo was taken (GPS coordinates), GPS Accuracy, longitude and latitude, address; reverse geocoding from GPS, and/or other location information. Image dimensions may include pixel dimensions, file size, and/or other image dimensions. Exchangeable image file format (EXIF) data may include camera manufacturer, model, software version, proprietary code, compression, resolution, exposure time, file source, and/or other EXIF data.

Sanity checks may be used to detect suspicious EXIF tags (e.g., tags added by most photo editing programs). By way of non-limiting example, image dimensions of a digital image may be compared to image dimensions an image authentication apparatus or digital imaging device is configured for. Responsive to the image dimensions of the digital image being outside the scope of the image dimension range of the digital imaging device, the digital image may have been altered.

In some embodiments, an image authentication apparatus, the same as or similar to image authentication apparatus 200 (as described in connection with FIG. 2) and/or digital imaging device, the same as or similar to image capture module 101 (as described in connection with FIG. 1) may be configured to capture a digital image and transmit the digital image for authentication. By way of non-limiting example, sanity checks may be performed comparing the time the digital image was captured to the time the image was transmitted for authentication. Responsive to the EXIF timestamp being outside of the timeframe that the time the digital image was captured to the time the image was transmitted for authentication, the digital image may have been altered. In some embodiments, responsive to the sanity checks determining that an image may have been altered, a notification may be issued indicating that the image has been corrupted.

In some embodiments, characteristics of the digital image and/or imaging device may be analyzed to determine whether the image was captured within the capabilities of the imaging device. Such analysis may include calculating the distance from the subject to the imaging device for comparison to hardware properties of the imaging device (e.g., focal length), mathematical analysis of pixel luminance and/or color traits of the digital image, calculation of speed based on a change in GPS coordinates, determining the integrity of the imaging device (e.g., whether the device is jail-broken), and/or other analysis.

In some embodiments, the authentication process (as described in connection with FIGS. 14, 15, and 16) and/or encoding process (as described in connection with FIG. 8) may be applied to digital video. Digital video may comprise a series of digital images, or frames, displayed in succession at a constant or variable rate. Parallel to digital images, frames may include a raster of pixels. A frame may comprise a width of W pixels and a height of H pixel rows. A frame may include source metadata, derived metadata, and/or other type of metadata. Source metadata may include technical information generated by the camera and/or other device.

Examples of source metadata may include one or more of the GPS coordinates where the digital video was captured, GPS accuracy, a date and time from a time server or a local clock, a device ID, a device operating system and version, a user ID, an organization ID, an assigned group name, a reverse geocoded address, and/or other metadata. By way of non-limiting example, time-based metadata may include information tied to the timeline within a video.

In some embodiments, derived metadata may be calculated using a non-human external information source. Derived metadata may include location from GPS, facial recognition, speech recognition, automatic transcription, and/or other metadata. By way of non-limiting example, facial recognition may determine whether the same person from another tagged piece of footage is the same person in a raw piece of video.

In some embodiments, the encoding process and/or authentication process as described herein may be applied to one or more frames of the digital video. In some embodiments, information associated with a first frame may be encoded into a second frame. In some embodiments, information associated with a first frame may be embedded into one or more pixels of a second frame.

In some embodiments, the encoding process may include encoding metadata information associated with a digital image and/or with one or more frames of a digital video.

In some embodiments, the encoding process and/or authentication process as described herein may include asymmetric public and/or private cryptographic keypairs. By way of non-limiting example, a cryptographic hash of the image may be created and sent with metadata to an image processing module, the same as or similar to image processing module 102 (as described in connection with FIG. 1). The image processing module may compute a signature of the image hash with the metadata utilizing a private key. The image processing module may embed the signature into the image. An image authentication module, the same as or similar to image authentication module 202 (as described in connection with FIG. 2) may authenticate the public key and decode the signature to reveal the original hash and metadata. The image authentication module may use the decoded signature to verify the cryptographic hash from the image.

In some embodiments, the encoding process and/or authentication process as described herein may include a blockchain processing network. By way of non-limiting example, the image processing module may be configured to upload the cryptographic hash of the image with obfuscated metadata to the blockchain processing network. In some embodiments, data may not be embedded into the image. The image authentication module may be configured to search the blockchain processing network for the cryptographic hash. Responsive to the cryptographic hash not being found, the image may be reported as "not authentic". Responsive to the cryptographic hash being found, the metadata may be deemed "un-obfuscated" and compared to the metadata of the image for verification.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A system configured for encoding a digital image to facilitate subsequent authentication, the system comprising:
   one or more hardware processors configured by machine-readable instructions to:
   capture a digital image comprising a plurality of pixels;
   partition the digital image into two or more working areas, the two or more working areas including a first working area having a first set of one or more pixels and a second working area having a second set of one or more pixels;
   generate a first code from the first set of one or more pixels;

overlay the second set of one or more pixels with an image representing the generated first code; and
   encode the generated first code into the second set of one or more pixels, wherein the encoding comprises overlaying the second set of one or more pixels of the digital image with identifying information and/or embedding the second set of one or more pixels with metadata;
   wherein encoding the generated first code includes utilizing asymmetric cryptographic keypairs having a public key and a private key in the second set.

2. The system of claim 1, wherein encoding the generated first code utilizing asymmetric cryptographic keypairs having a public key and a private key includes creating a cryptographic hash of the digital image.

3. The system of claim 2, wherein encoding the generated first code utilizing asymmetric cryptographic keypairs having a public key and a private key includes performing image processing on the cryptographic hash to produce an image hash.

4. The system of claim 3, wherein encoding the generated first code utilizing asymmetric cryptographic keypairs having a public key and a private key includes computing a signature of the image hash with the metadata utilizing the private key.

5. The system of claim 1, wherein encoding the generated first code utilizing asymmetric cryptographic keypairs having a public key and a private key includes embedding a signature into the image.

* * * * *